(12) United States Patent
Pedersen et al.

(10) Patent No.: US 7,928,983 B2
(45) Date of Patent: Apr. 19, 2011

(54) INTERACTIVE LABYRINTH CURVE GENERATION AND APPLICATIONS THEREOF

(75) Inventors: Hans Kohling Pedersen, Palo Alto, CA (US); Karansher Singh, Toronto (CA)

(73) Assignee: Daedal Doodle, LLC, Palo Alto, CA (US)

( * ) Notice: Subject to any disclaimer, the term of this patent is extended or adjusted under 35 U.S.C. 154(b) by 961 days.

(21) Appl. No.: 11/810,391

(22) Filed: Jun. 4, 2007

(65) Prior Publication Data

US 2008/0297514 A1    Dec. 4, 2008

(51) Int. Cl.
    *G06T 11/20*     (2006.01)
(52) U.S. Cl. ......... 345/442; 345/470; 345/441; 345/588
(58) Field of Classification Search .................. 345/441, 345/442, 588, 470
    See application file for complete search history.

(56) References Cited

U.S. PATENT DOCUMENTS

| | | | |
|---|---|---|---|
| 4,718,017 A | | 1/1988 | Hutton et al. |
| 5,602,943 A | | 2/1997 | Velho et al. |
| 5,831,633 A | | 11/1998 | Van Roy |
| 6,268,871 B1 | * | 7/2001 | Rice et al. .................. 345/442 |
| 6,347,995 B1 | | 2/2002 | Igarashi et al. |
| 6,804,573 B2 | | 10/2004 | Goldman |
| 6,968,255 B1 | | 11/2005 | Dimaridis et al. |
| 2002/0135578 A1 | * | 9/2002 | Wenzel et al. ............... 345/442 |
| 2005/0237325 A1 | * | 10/2005 | Motter et al. ................ 345/442 |
| 2009/0027396 A1 | * | 1/2009 | Frisken ........................ 345/442 |

OTHER PUBLICATIONS

Dafner et al., "Context-based Space Filling Curves" EUROGRAPHICS 2000, vol. 19 (2000), n.3.
Julius et al., "D-Charts: Quasi—Developable Mesh Segmentation" EUROGRAPHICS 2005, vol. 24, n.3.
Fleischer et al., "Cellular Texture Generation" Proceedings of the 22nd annual conference on Computer graphics and interactive techniques 1995 ACM, p. 239.
Mitani et al., "Making Papercraft Toys from Meshes using Strip-based Approximate Unfolding" ACM Transactions on Graphics (TOG) vol. 23, Issue 3 (Aug. 2004), p. 259.
Witkin et al., "Using Particles to Sample and Control Implicit Surfaces" 1994, In Proceedings of SIGGRAPH 94, Computer Graphics Proceedings, Annual Conference Series, 269-278.
Witkin et al., "Reaction-Diffusion Textures" Computer Graphics, vol. 25, No. 4, Jul. 1991, p. 299.

(Continued)

*Primary Examiner* — Michelle K Lay
(74) *Attorney, Agent, or Firm* — Lumen Patent Firm

(57) ABSTRACT

Complex labyrinth curves are interactively generated by an iterative process that spatially modulates curve evolution by an image or other function defined on the evolution space. After curves and evolution parameters are initialized [100], the iterative process allows the curve and evolution parameters to be interactively modified by a user [102], resamples the curves [104], and spatially modulates the curves according to the evolution parameters [106]. The evolved labyrinth curves are may be processed [110] for use in various applications including animation, maze creation, intricate artistic patterns, and graphical user interfaces that map linearly ordered data to the evolved curve and allow the data to be navigated using the rendered curve. The evolved curves can also be triangulated and projected to a plane to create patterns for manufacturing developable surfaces.

45 Claims, 29 Drawing Sheets

OTHER PUBLICATIONS

Shatz et al., "Paper craft models from meshes" Visual Comput. (2006) 22: 825-834, Springer-Verlag.

Liu et al., "Geometric Modeling with Conical Meshes and Developable Surfaces" Proceedings of ACM SIGGRAPH 2006 vol. 25, Issue 3 (Jul. 2006) pp. 681-689.

Turk, G. "Generating Textures on Arbitrary Surfaces Using Reaction-Diffusion" In Computer Graphics (Proceedings of SIGGRAPH 91), vol. 25, 289-298.

Mitani et al., "Making Papercraft Toys from Meshes using Strip-based Approximate Unfolding" SIGGRAPH 04.

* cited by examiner

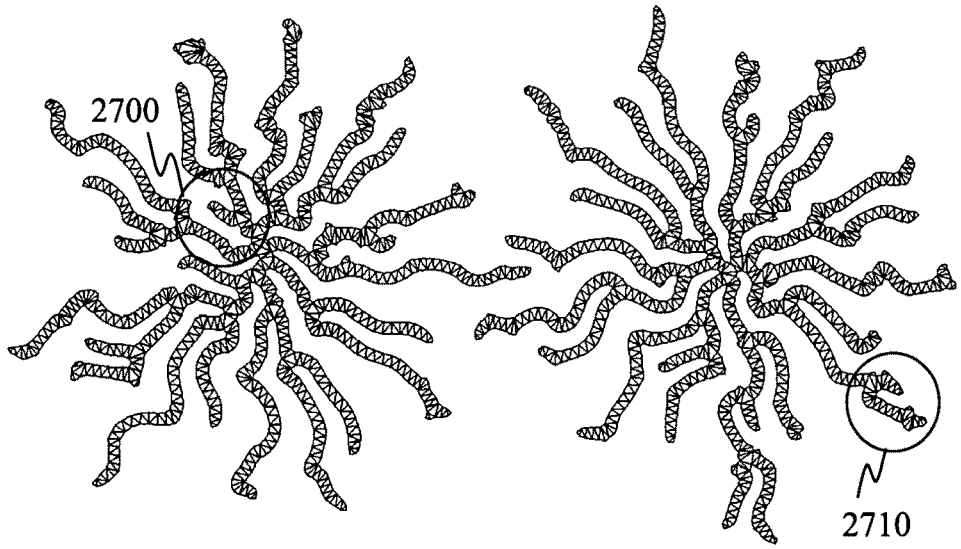
*Fig. 27A*     *Fig. 27B*
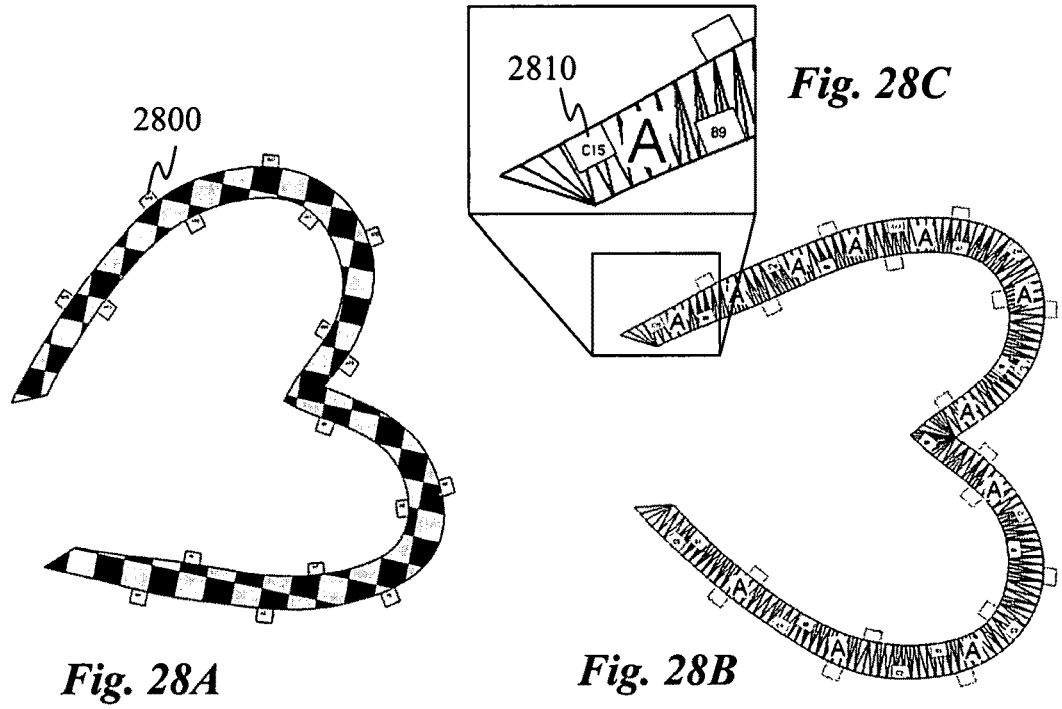
*Fig. 28A*     *Fig. 28B*

*Fig. 32A*
*Fig. 32B*
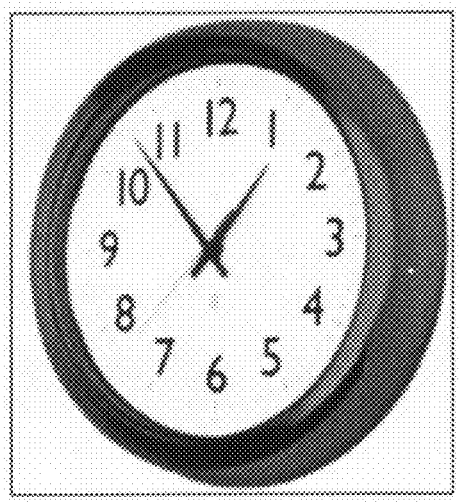
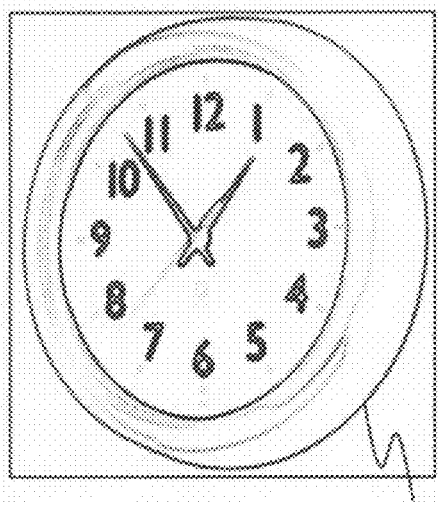
3200
3202
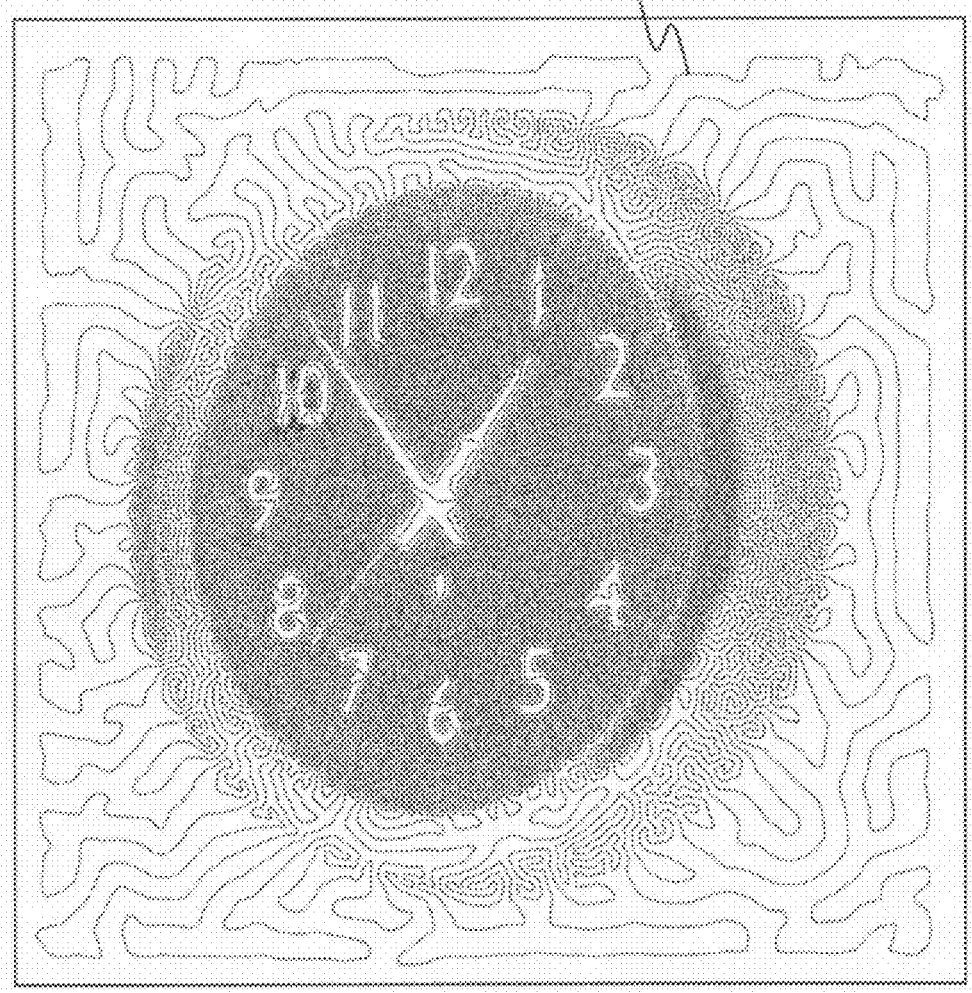
*Fig. 32C*

INTERACTIVE LABYRINTH CURVE GENERATION AND APPLICATIONS THEREOF

FIELD OF THE INVENTION

The present invention relates generally to computer graphics and computer assisted design techniques. More specifically, it relates to interactive computer-implemented methods for generating maze and labyrinth patterns.

BACKGROUND OF THE INVENTION

For centuries, maze and labyrinth patterns have been manually created as artistic designs, religious symbols, and intellectual puzzles. Due to their high geometric complexity, large and intricate maze and labyrinth patterns are time consuming to produce manually. Accordingly, various computer implemented methods have been developed to assist in the creation of such patterns.

U.S. Pat. No. 6,347,995 describes the construction of a maze on a discrete rectangular grid. Two grid blocks are marked start and end by a user. The system then generates a random trunk path connecting start and end blocks. U.S. Pat. No. 4,718,017 presents similar techniques for generating mazes on a 2D grid of cells. The mazes are formed by marking each cell in the grid as either a wall or a path (black or white). Thus, the paths are restricted to follow the cells of a grid. When projected to the surface of a 3D object, however, the grid often must be stretched, sometimes severely distorting the pattern.

U.S. Pat. No. 5,831,633 describes a technique for generation of complex fractal imagery. In a "drawing process" the user specifies a "template", i.e. a series of curve segments. Individual segments are then replaced with a transformed copy of the template in a recursive process that is a generalization of Mandelbrot's original algorithm. The end result is the "shape" of a fractal. In a "colorization" process the user controls the coloring of the fractal with the help of a "color path" that is specified as part of the template. Though the coloring process is independent of the drawing process, they both use the same iterative process. The technique does not produce mazes or labyrinths.

U.S. Pat. No. 6,968,255 describes a fractal technique for generating decorative curve patterns for applications related to embroidery. The inputs to the algorithm are a closed 2D boundary curve and a fractal shape (i.e., a pathway/curve with associated rules for fractal generation). The algorithm then iteratively applies the fractal axioms to the pathway. The resulting fractal curve is then smoothed and clipped to the boundary curve. Fractal techniques such as this one start out with a template and iteratively replace parts of the template with transformed copies of the template in a deterministic process.

U.S. Pat. No. 6,804,573 deals with the automatic creation of embroidery information from an image. The image is first segmented into closed regions (called objects) based on color posterization. Thin objects are those which can be approximated by a constant offset thickness around skeletal curves. The skeletal curves or medial axis of the thin object is thus computed and a constant thickness stitch defined along it. Thick objects are fragmented into sub-regions that are monotonic with respect to a given stitch angle (so that they can be stitched in runs). A stitch ordering over the parts is also defined to minimize thread cuts as the needle moves from part to part. The technique involves no evolution of a pattern toward increasing geometric complexity, and does not produce a maze or labyrinth.

U.S. Pat. No. 5,602,943 discloses a method to produce a monochrome image from a grayscale or color image by first defining a traversal pattern based on a space-filling curve. Each point on the curve corresponds to a cluster of pixels of the image. The cluster is evaluated for intensity and used to generate an equivalent set monochromatic pixels. The space filling curves are picked from a standard set Hilbert, Peano or Sierpinski curves at a fixed level of subdivision globally determined by the image. The curves do not evolve.

SUMMARY OF THE INVENTION

In contrast with prior techniques, the present invention provides methods for generating labyrinth curves by an evolution process guided by user interaction and spatially modulating evolution parameters that influence the curve evolution in different ways at different locations. In an iterative process, the curve evolution is controlled in part by evolution parameters that spatially modulate the curve by an image, surface texture map, or other function defined on the evolution space. The evolution process also allows the curve and evolution parameters to be interactively modified by a user, permitting the user to steer the evolution while it is in progress. The labyrinth curves may be evolved on any flat or curved two dimensional surface as well as in a three dimensional space. In one application of the technique, curves evolved on surfaces may be used to generate developable surfaces.

In one aspect, the invention provides a computer-implemented method for generating a labyrinth. The method includes initializing curve evolution parameters and a curve network including a curve, evolving the curve using an iterative process such that during the iterative process the curve evolves in accordance with the curve evolution parameters and user input to produce an evolved curve having an increased geometric complexity (i.e., increasing curve length and number of inflection points), and rendering the evolved curve. Each iteration of the iterative process includes allowing the curve network and the curve evolution parameters to be modified by a user, resampling the curve to increase the uniformity of spacing between adjacent point samples of the curve, and spatially modulating the curve by the curve evolution parameters. The spatial modulation preferably includes computing, for each of the sample points, a displacement calculated by evaluating a function defined on the evolution space. The displacement preferably is a combination of a random displacement, a smoothing displacement, and an attraction-repulsion displacement.

The curve is composed of a linearly ordered set of sample points embedded in an evolution space having a dimension of at least two. The evolution space may be, for example, a two-dimensional Euclidean space, a two-dimensional non-Euclidean space embedded in a three-dimensional Euclidean space, or a three-dimensional Euclidean space. The curve network may include a second curve (or multiple additional curves) embedded in the evolution space, in which case the method also includes evolving and rendering the additional curve or curves. Although a curve can intersect other curves, the method is designed to prevent any curve from inadvertently crossing itself or other curves during evolution. A point evolution rate may be defined and associated with a selected sample point of the curve, inhibiting displacement of the selected sample point during evolution for a proportion of iterations dependent upon the point evolution rate. The point evolution rate may be set so that only selected points are evolved while unselected points stay fixed.

The curve network may also include a boundary embedded in the evolution space and having a dimension one less than the evolution space dimension. Computing the attraction-repulsion displacement in this case includes computing a boundary displacement due to attraction-repulsion between the sample points of the curve and boundary sample points. In addition, the curve network may also contain a boundary gap corresponding to a subset of the boundary. Boundary gaps do not contribute to the calculation of displacements. Instead, the combination of boundary and boundary gaps allow the definition of a number of interconnected regions. A region is defined by a closed loop formed by connected boundary and boundary gaps. Each region may have its own unique set of curve evolution parameters that produce a distinct appearance of the evolving curves within that region. Although parameters can vary between regions, the same mathematical equations are used to evolve the curve network in all regions. The use of the same evolution equations allows blending of parameters where the evolving curves cross a boundary gap between two regions, thereby creating smooth transitions.

The curve evolution parameters include real-valued functions defined on the evolution space. For example, the curve evolution parameters may include a function whose values at points in the evolution space are derived from pixel intensity values of a surface texture map (e.g., an image or other more complex texture map), thereby modulating the curve during evolution by image intensity. In a preferred embodiment, the curve evolution parameters include a randomness strength function, a smoothness strength function, an attraction-repulsion function, and a scaling function, all defined on the evolution space and used to spatially modulate the curve. Computing the random displacement includes evaluating the randomness strength function and the scaling function at a point in the evolution space, and stochastically selecting a random offset vector. Computing the smoothing displacement includes evaluating the smoothness strength function and the scaling function at a point in the evolution space and computing a weighted average of adjacent points. Computing the attraction-repulsion displacement includes evaluating an attraction-repulsion strength function and the scaling function at a point in the evolution space. The computed attraction-repulsion displacement between two points on the curve is an attraction if the two points are separated by a distance greater than a predetermined distance and a repulsion if the two points are separated by a distance less than the predetermined distance.

During each iteration, the curve is preferably resampled by adding sample points to subdivide curve segments whose length is greater than a maximum threshold distance and removing sample points to delete curve segments whose length is less than a minimum threshold distance. The maximum threshold distance and the minimum threshold distance are computed from the spatially-dependent real-valued scaling function defined on the evolution space, so that the resampling level of detail is also spatially modulated by the evolution parameters.

Preferably, evolving the curve includes rendering and displaying the curve during the evolution process. The evolution of the curve may be interactively controlled by allowing the curve network and the curve evolution parameters to be modified by a user. This modification may include, for example, allowing boundary sample points, boundary gap, curve sample points, and/or point evolution rates to be edited by the user. The editing of the curve evolution parameters may be implemented by allowing the user to select any region by clicking on it. Preferably, the selected region is rendered on the screen with a distinct appearance to make it clear in which area the parameter values are being modified. The user can then select from a finite list of predefined patterns. The parameter values for the selected pattern are then stored in the parameter functions within the region. Rather than editing all the parameters at once, the user can also choose to edit a single parameter within a selected region. The use of a simple, transparent user interface based on regions, boundary curves, and patterns eliminates the need for a user to understand the complex underlying mathematical parameters.

An evolved curve or curves may be rendered and/or further processed in various ways for different useful applications. For example, distances along the length of the evolved curve may be linearly mapped to audio or other linearly ordered data. A user interface may then be provided, allowing the linearly ordered data to be navigated using the rendering of the evolved curve. In another example, the evolved curve may be rendered by linearly mapping a string of text to the evolved curve such that the string of text is aligned with the evolved curve. The evolved curve may also be rendered by selecting intensity values for a rendered point of the evolved curve from a corresponding point of an image projected onto the evolution space. In another exemplary application, an evolved curve or curves may be used to produce developable surfaces. In this case, the evolution space is a non-Euclidean surface containing a closed curve separating regions of the evolution space. After curve evolution, the regions are triangulated to generate triangulated strips. The triangulated strips are then projected onto a plane and cut to avoid self-intersections. An article of manufacture may be produced by cutting a material using the unfolded strips as a pattern. Edges of the resulting cut material may be joined to form a physical article resembling the original non-Euclidean surface.

The developable surfaces generated by the method have several desirable properties that distinguish them from existing developable surface techniques:

1. The geometry of the triangle strips has a visually attractive texture.
2. The orientation, scale, and texture of the strips can be controlled by providing input functions in the form of images or texture maps. These controls can be used to create developable surface approximations with attractive stylized looks.
3. The stylized appearance can be enhanced by rendering or manufacturing strips in different colors.
4. The strips can approximate a three dimensional surface to a desired degree of accuracy by controlling the point spacing and strip width. The method is particularly well suited for smooth three dimensional surfaces.
5. The exact number of triangle strips (two or more) can be specified as an input parameter (i.e., the number of curve loops). In particular, the number of strips will typically be low (single digit) for most applications. In general, the lower the number of strips the simpler the assembly of the physical object.
6. By evolving curve loops in semi-developable areas of a three dimensional surface, the number of self-intersections resulting from developing the triangle strips into the plane can be kept low.
7. We note that the method produces attractive results even when the developed triangle strips self-intersect. Any intersecting strips are simply cut and manufactured in two pieces which are subsequently joined when the physical article is assembled.
8. A simple heuristic rule on the placement of the input curves will reduce the number of self-intersections in the developed triangle strips.

BRIEF DESCRIPTION OF THE DRAWINGS

FIGS. 27A-B are diagrams illustrating two dimensional triangle strips developed from a sphere.

FIGS. 28A-C are diagrams that illustrate how tabs and guides printed on the interior side of triangle strips can be used for easier assembly of physical articles.

FIGS. 32A-C are diagrams illustrating the use of automated feature detection for automated generation of boundary curves.

DETAILED DESCRIPTION

Figure 1:
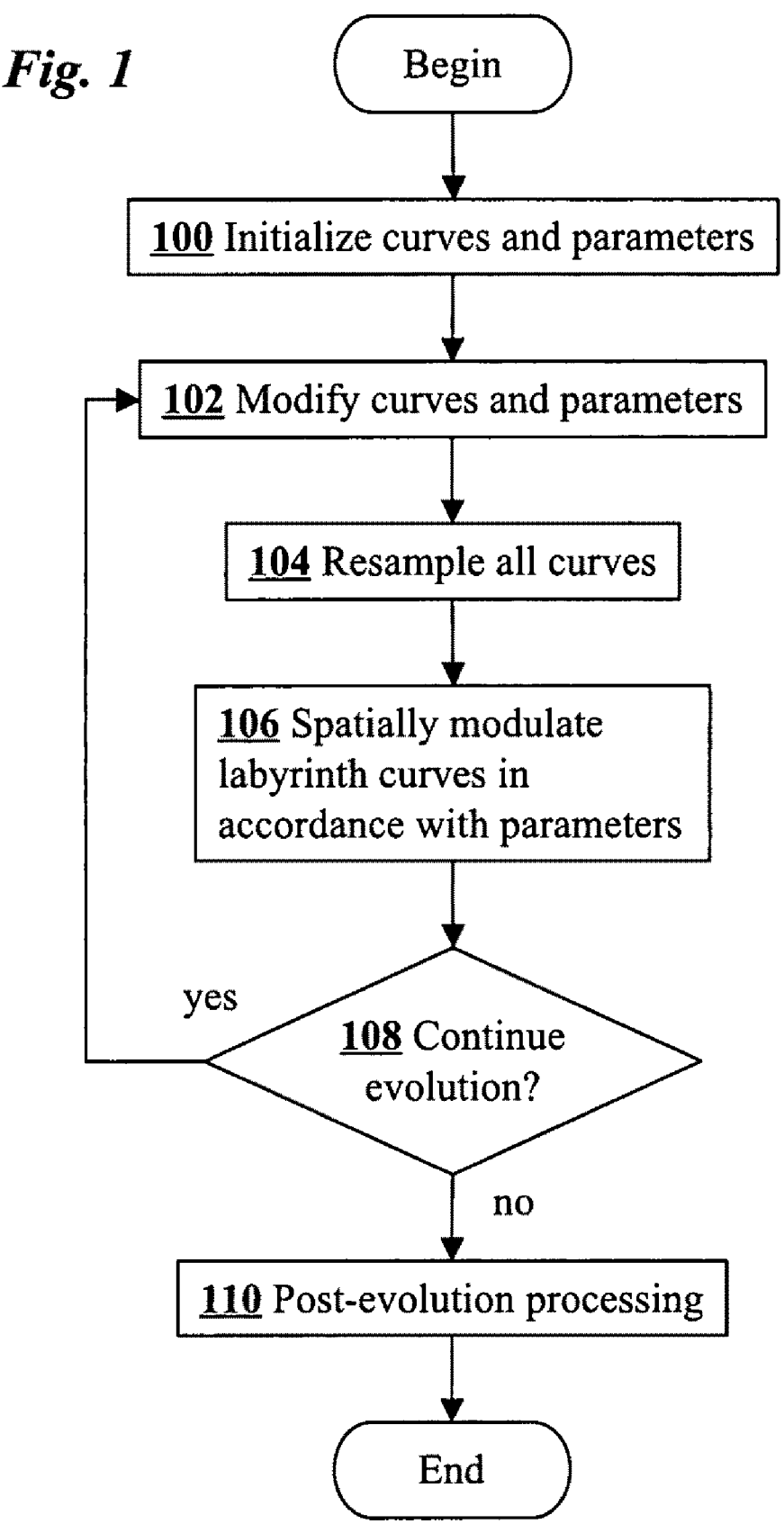
FIG. 1 is a flow chart illustrating main steps of a method for generating labyrinth curves, according to an embodiment of the present invention.

Main steps of a method for generating labyrinth curves according to an embodiment of the present invention are shown in FIG. 1. The method includes an initialization step 100 in which curve evolution parameters are initialized as well as a curve network including one or more curves. Each curve is evolved by iterating steps 102, 104, 106 as long as a decision is made at step 108 to continue the evolution. When the evolution is stopped, a post-evolution processing 110 is performed. Step 102 of the iterative process allows the curve network and evolution parameters to be modified by a user so that the evolution can be interactively guided as it progresses. In step 104 the curve is resampled to increase the uniformity of spacing between adjacent point samples of the curve, and in step 106 the curve is spatially modulated in accordance with the curve evolution parameters.

The effect of the iterative process shown in FIG. 1 is to evolve an initialized curve into an evolved curve, as shown in FIGS. 13A-D, which illustrate four stages in the evolution of a curve. An initial curve 1300 shown in FIG. 13A evolves after numerous iterations into curve 1302 in FIG. 13B, which evolves further into curve 1304 in FIG. 13C, and finally into evolved curve 1306 in FIG. 13D. As is evident from this sequence of figures, the evolved curve has an increased geometric complexity. In the present context, geometric complexity is related to increasing curve length and number of inflection points.

Figures 21A, 21B:
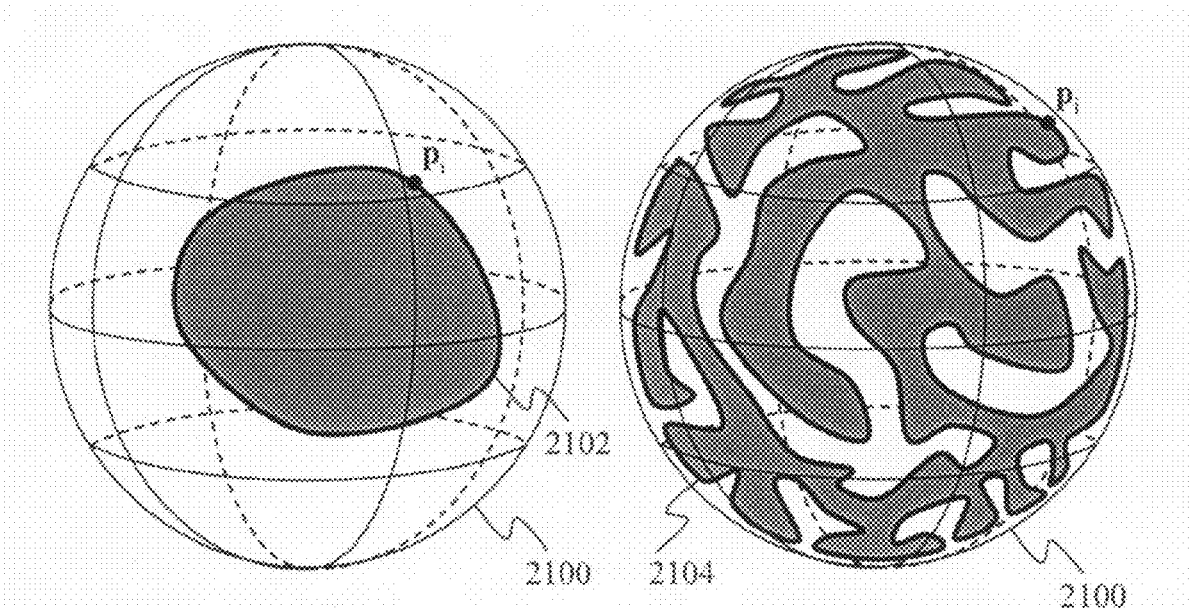
FIGS. 21A-D are diagrams illustrating evolution of a curve on a curved surface and evolution of a curve in a three dimensional space with surfaces defining boundaries, according to an embodiment of the present invention.
Figures 21C, 21D:
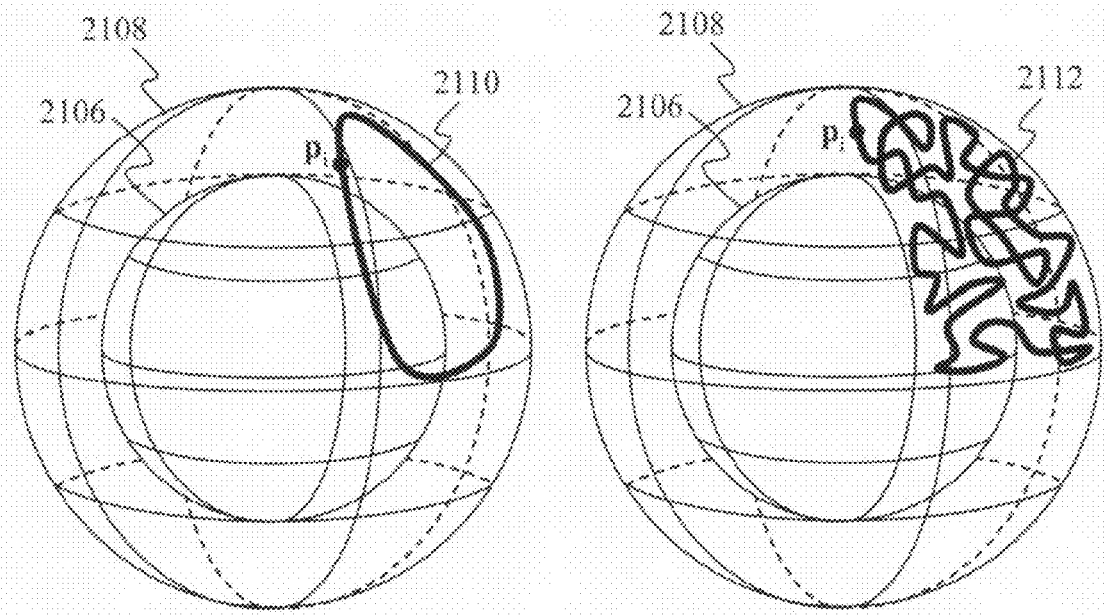

The curve is preferably represented as a piecewise linear curve composed of a linearly ordered set of sample points. For example, initial curve 1300 in FIG. 13A contains sample points $p_{i-1}$, $p_i$, $p_{i+1}$. The curve and its sample points are embedded in an evolution space having a dimension of at least two and are constrained within the evolution space during the evolution. The evolution space may be, for example, a two-dimensional Euclidean space, such as the rectangular region 1308 shown in FIGS. 13A-D. Alternatively, the evolution space may be a two-dimensional non-Euclidean space embedded in a three-dimensional Euclidean space, such as the sphere 2100 shown in FIGS. 21A-B. Initial curve 2102 in FIG. A evolves within the two dimensional surface of sphere 2100 into evolved curve 2104 in FIG. 21B. The evolution space may also be a three-dimensional Euclidean space, such as the volumetric region bounded by two spheres 2106 and 2108 shown in FIGS. 21C-D. Initial curve 2110 in FIG. 21C evolves within the three dimensional space between spheres 2106 and 2108 into evolved curve 2112.

Figure 14A:
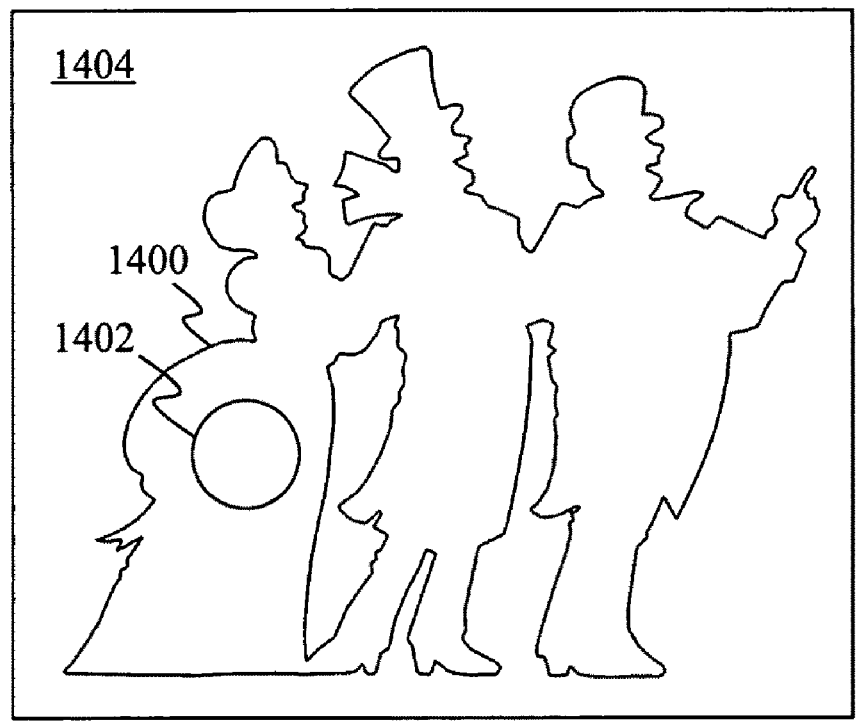
FIGS. 14A-B are diagrams illustrating the evolution of a curve within a boundary, according to an embodiment of the present invention.

Spheres 2106 and 2108 are examples of boundaries which are used serve to constrain curve evolution to a subspace of the evolution space. A boundary is a geometric object in the evolution space having a dimension one less than the evolution space dimension. For example, a boundary in a three dimensional evolution space is a two dimensional surface. This was illustrated above by two dimensional surfaces 2106 and 2108 in three dimensional evolution space of FIGS. 21C-D. In a two dimensional evolution space, a boundary is a one dimensional curve, as illustrated by the one dimensional boundary curve 1400 in two dimensional evolution space 1404 of FIGS. 14A-B. The boundary 1400 constrains the evolution of curve 1402 in FIG. 14A to the two dimensional subspace enclosed by the boundary, resulting in evolved curve 1406 in FIG. 14B which is contained within the region enclosed by boundary curve 1400.

Figure 2:
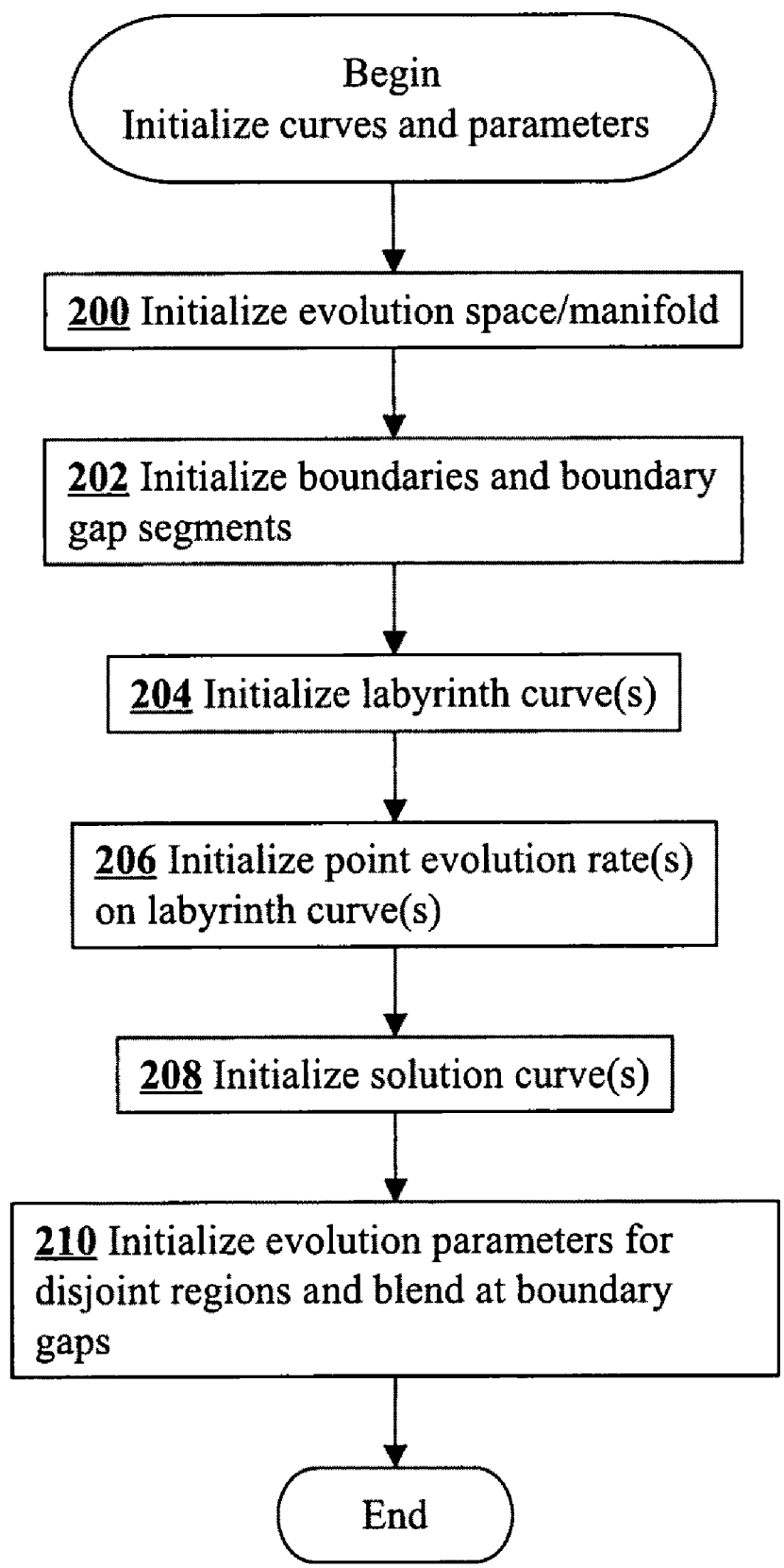
FIG. 2 is a flow chart illustrating steps of a curve and parameter initialization routine, according to an embodiment of the present invention.
Figure 31A:
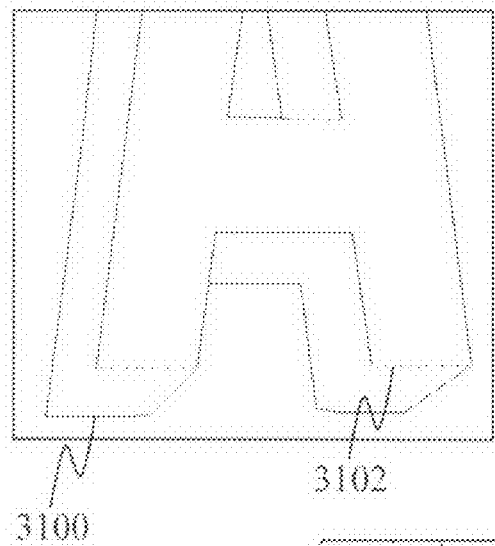
FIGS. 31A-D are diagrams illustrating the process of blending parameter functions near boundary gap curves to obtain smooth transitions in the evolved curves between different regions.
Figure 31B:
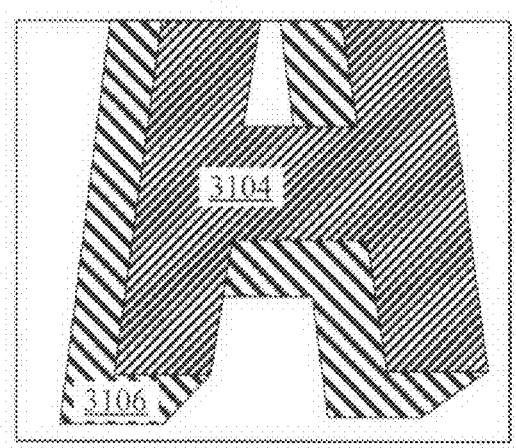
Figure 31C:
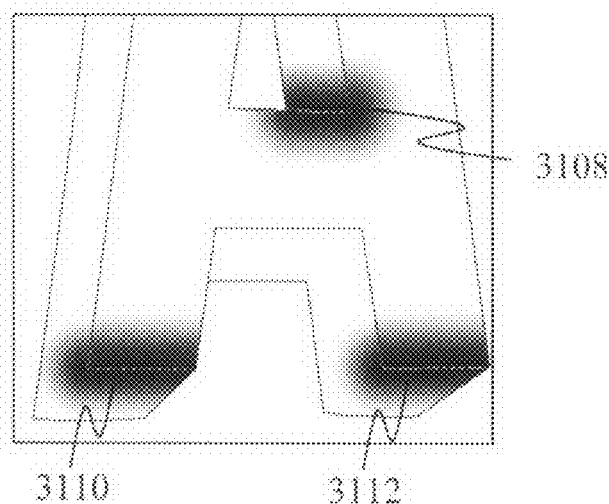
Figure 31D:
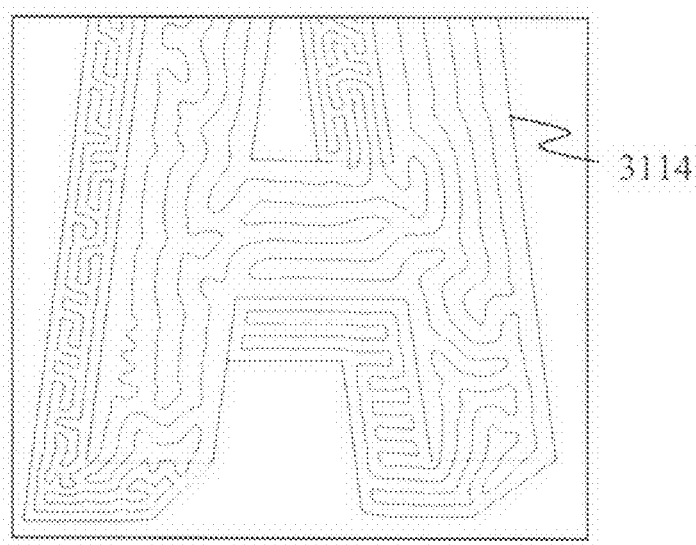
Figure 33A:
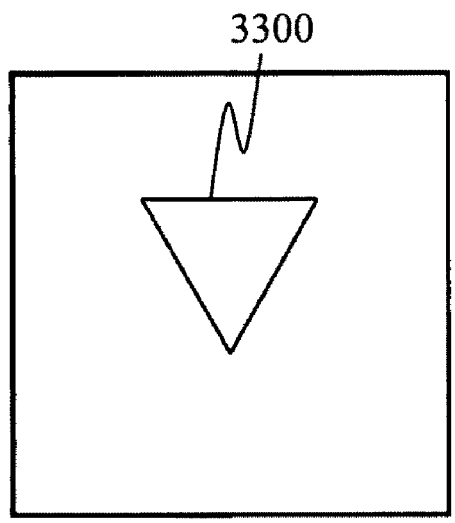
FIGS. 33A-D are diagrams illustrating how slight variations in input curves can lead to very different results of the curve evolution.
Figure 33B:
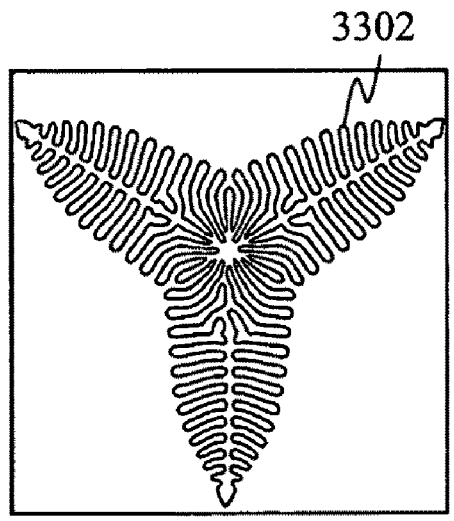
Figure 33C:
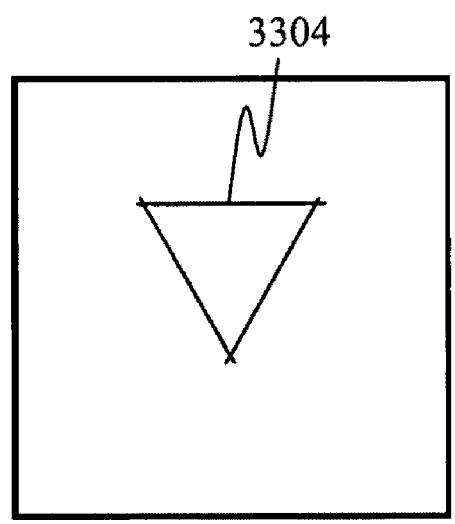
Figure 33D:
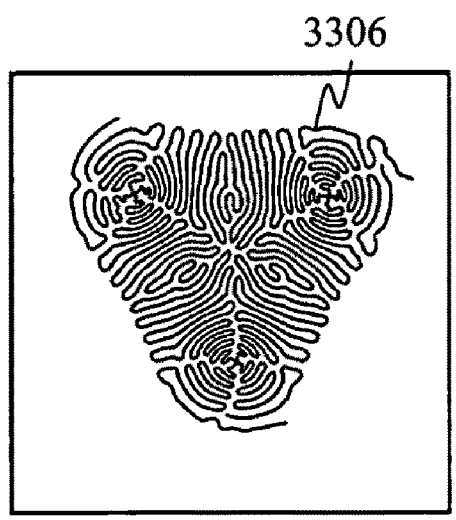

Prior to curve evolution, a routine initializes curves, boundaries, and evolution parameters, as shown in FIG. 2. The evolution space is selected and initialized in step 200 where the dimension of the space is defined and, in the case of a non-Euclidean space, it is further defined, e.g., as a parametric surface or surface mesh embedded in three dimensional Euclidean space. At step 202 boundaries and boundary gaps may be drawn by a user or automatically selected, resulting in distinct regions of the evolution space. FIG. 31A shows a network of boundary and boundary gap curves drawn by the user. The boundary curves, such as curve 3100, are shown as solid lines and the boundary gap curves, such as curve 3102, as dashed lines. These curves were drawn manually. FIG. 32B shows feature edges, such as edge 3200, extracted from the image in FIG. 32A, automatically computed by running an image processing edge detection filter. These edges were used to automatically compute boundary curves that were used in the evolution of the curve 3202 shown in FIG. 32C. Similarly, an initial curve may be drawn or automatically created in each of the regions of the evolution space. For example, by default, a circle may be automatically created in each region. In another illustration, FIG. 33A shows a triangle 3300 which evolves into labyrinth 3302 shown in FIG. 33B. FIG. 33C shows three intersecting lines 3304 appearing almost identical to the triangle 3300 in FIG. 33A but which evolve into very different labyrinth curve 3306 shown in FIG. 33D. The curve network may include multiple curves embedded in the evolution space. In this case, the iterative process evolves each curve. In step 206 of FIG. 2, a point evolution rate may be defined and associated with one or more selected sample points of a curve. The point evolution rate serves to inhibit displacement of the selected sample point during evolution for a proportion of iterations that is dependent upon the point evolution rate. For example, a point whose evolution rate is set to zero is effectively frozen and is not displaced by the evolution process (unless its evolution rate is modified by the user or it is edited by the user). A solution curve may be selected in step 208 to enforce a desired solution path through the evolved labyrinth curve. A solution curve is defined and behaves like a boundary curve, with the exception that it has half the repulsion radius of a boundary curve. Various evolution parameters are defined in step 210. In a preferred embodiment, the evolution parameters include global scalar values, such as an average point spacing D and resampling threshold parameters $k_{max}$ and $k_{min}$, as well as functions whose values vary from location to location in the evolution space. These functions, which are used to spatially modulate the curve evolution in specific ways, are typically real-valued scalar functions, but may also be vector fields or other functions defined on the evolution space. Any of these functions may be defined by combining functions defined on distinct regions of the evolution space. If such a function has a discontinuity at a boundary where a boundary gap is present, the function may be modified automatically near the boundary gap to create continuous transition. For example, if a function is defined by combining two images positioned in adjacent regions of the evolution space separated by a boundary curve with a boundary gap, then the two images may be blurred or blended near the boundary gap to create a more continuous transition in the function. FIG. 31A shows a set of boundary and boundary gap curves, such as boundary curve 3100 and boundary gap 3102, defining several regions. FIG. 31B illustrates a curve parameter with different values in each region, where the function values are indicated by different shades of grey. Regions 3104 and 3106, for example, have different shades of grey corresponding to different values of the parameter function. FIG. 31C shows blend regions 3108, 3110, 3112 near the boundary gap curves. The width of these regions is set by default but can be edited by the user. These blend regions are the areas where curve evolution parameters are blended, e.g., using a weighted average based on the distance from the boundary gap curves, such as curve 3102. FIG. 31D shows a single curve 3114 evolved from the blended parameters. Note the distinct pattern styles in the different regions and the smooth transitions where the evolved curve crosses the boundary gaps.

Figure 3:
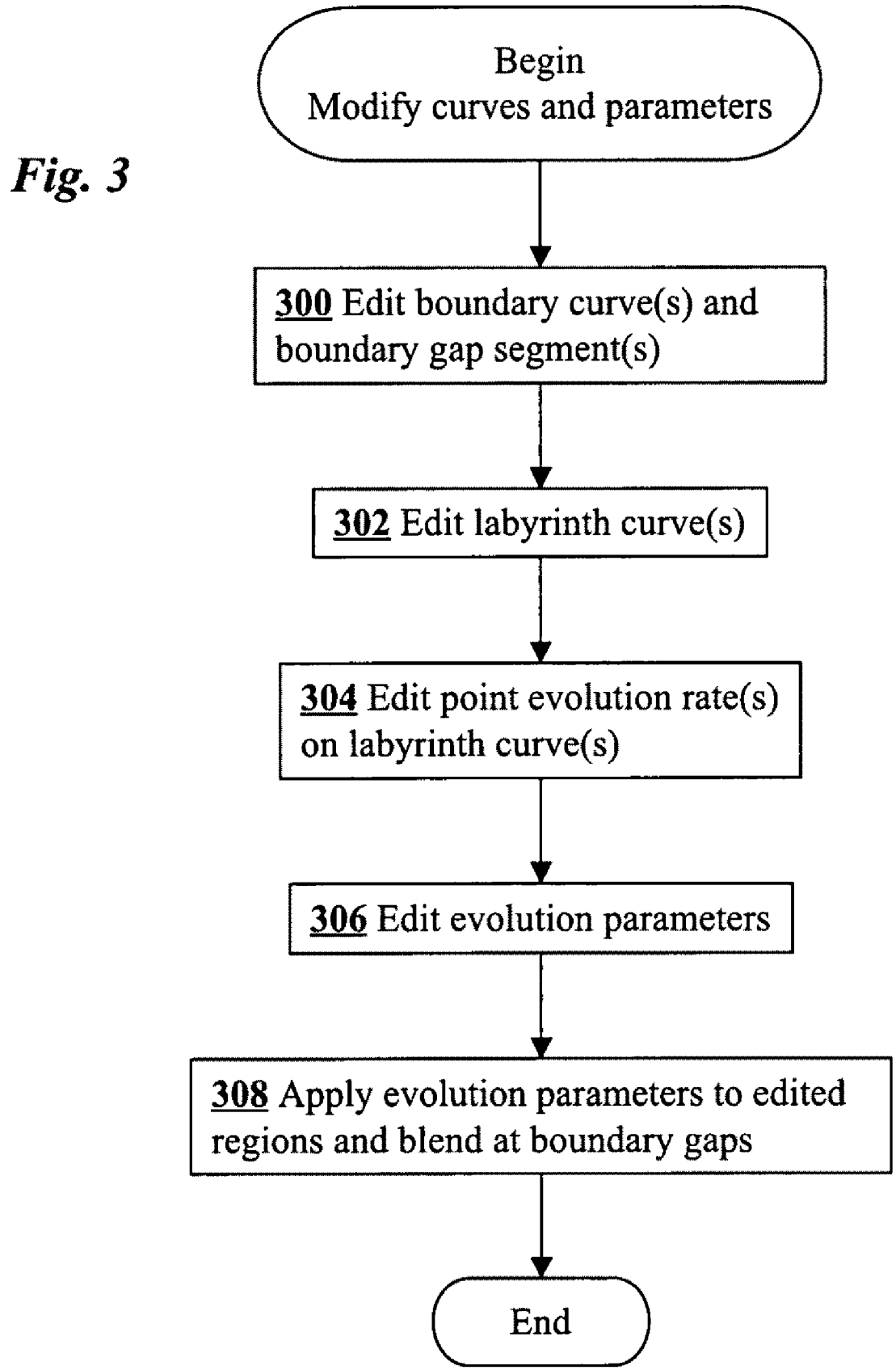
FIG. 3 is a flow chart illustrating steps of a routine to allow curves and parameters to be modified by a user, according to an embodiment of the present invention.

After the initialization is complete, each curve is evolved using an iterative process, where each iteration includes steps 102, 104, 106 of FIG. 1. Preferably, while the curve is evolving in the iterative process, it is rendered and displayed to the user in real time so the user can observe the evolution process. At any point in the process, the user may interrupt the evolution using a graphical user interface and modify a curve or evolution parameter, as indicated by step 102. The details of this step are shown in FIG. 3. The solution curve, boundary curve(s) and boundary gap(s) are allowed to be edited by the user in step 300, e.g., using a graphical user interface to select sample points of the curves and then move them or otherwise change their properties. Similarly, step 302 allows the evolving labyrinth curves to be edited by the user, and step 304 allows point evolution rates for sample points of the curve to be edited by the user, e.g., using a pop-up slide bar graphical user interface element. The evolution parameters may be modified in step 306. Global scalar parameters may be edited, for example, using slide bar graphical user interface elements. Functions defined on the evolution space may be edited by modifying them in specific regions, applying local or global transformations to them, replacing them with completely different definitions, or otherwise modifying them. If one or both functions meeting a boundary gap have been modified, blending may be performed in step 308 to create a smooth transition.

Figure 4:
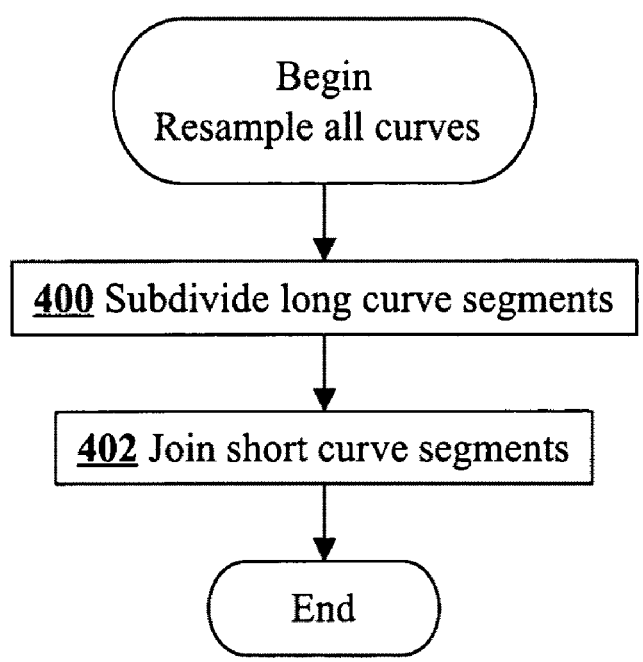
FIG. 4 is a flow chart illustrating steps of a curve resampling routine, according to an embodiment of the present invention.
Figure 12:
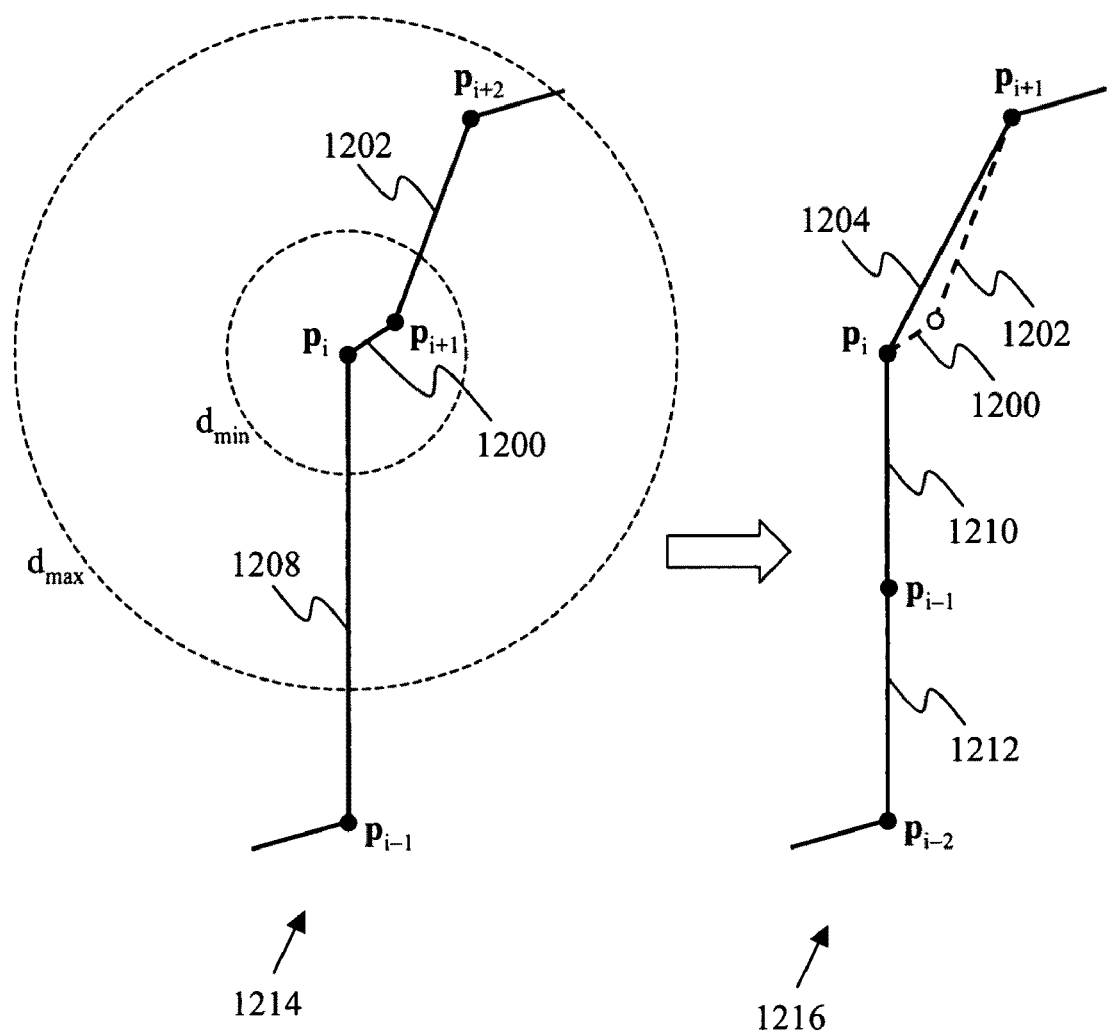
FIG. 12 is a diagram illustrating resampling of sample points on a curve, according to an embodiment of the present invention.
Figure 13A:
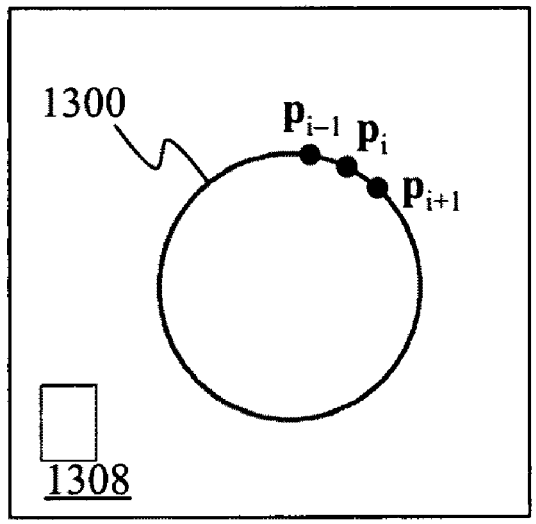
FIGS. 13A-D are diagrams illustrating four stages in the evolution of a curve, according to an embodiment of the present invention.
Figure 13B:
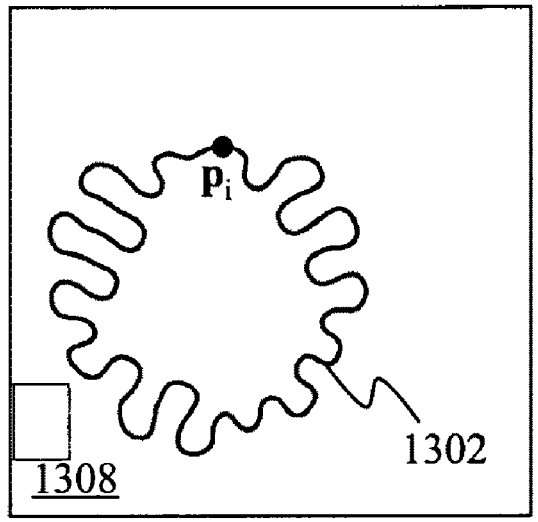
Figure 13C:
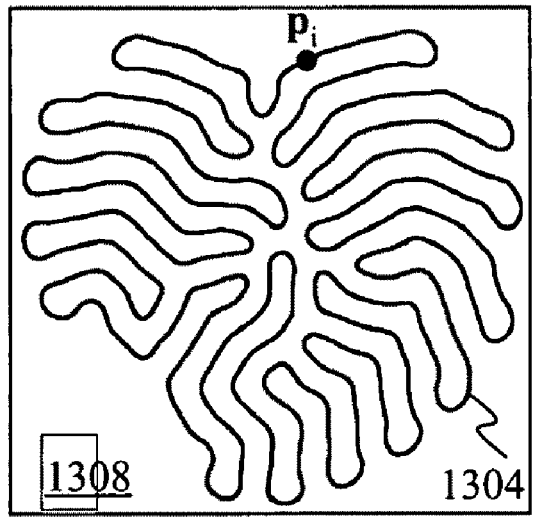
Figure 13D:
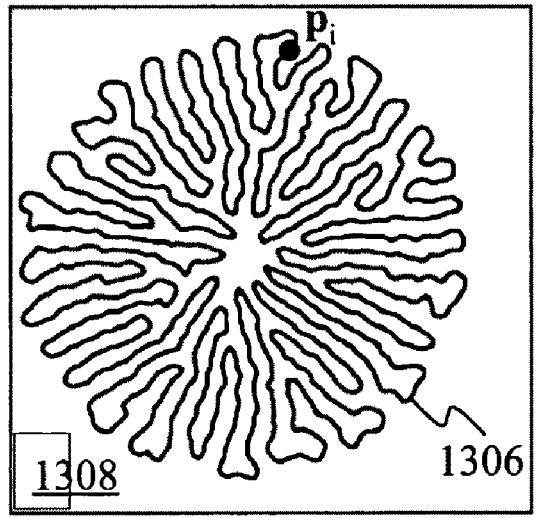

During each iteration, the curve is preferably resampled using the routine shown in FIG. 4. In addition, if boundary curves and solution curves have been modified, they are also preferably resampled. Resampling includes adding sample points to subdivide curve segments whose length is greater than a maximum threshold distance, and shown in step 400, and removing sample points to delete curve segments whose length is less than a minimum threshold distance, as shown in step 402. FIG. 12 is a diagram illustrating an example of resampling of sample points on a curve 1214 to produce a resampled curve 1216. In this example, curve 1214 has segment 1200 that is shorter than a minimum threshold distance and segment 1208 that is longer than a minimum threshold distance. Consequently, point $p_{i+1}$ is removed from curve 1214 so that short segment 1200 is joined with adjacent segment 1202 to form a single segment 1204 of resampled curve 1216. In addition, long segment 1208 of curve 1214 is subdivided into two shorter segments 1210 and 1212 of curve 1216 by adding a new point $p_{i-1}$. The maximum threshold distance and the minimum threshold distance are preferably spatially-dependent functions computed from a spatially-dependent real-valued scaling function $\delta$ defined on the evolution space, so that the resampling level of detail is spatially modulated by the evolution parameters. More specifically, the maximum threshold $d_{max}$ and minimum threshold distance $d_{min}$ for a segment connecting points $p_i$ and $p_{i+1}$ may be calculated according to the equations $$d_{max} = k_{max} \cdot D \cdot [\delta(p_i) + \delta(p_{i+1})]/2,$$

and $$d_{min} = k_{min} \cdot D \cdot [\delta(p_i) + \delta(p_{i+1})]/2,$$

where $k_{max}$ and $k_{min}$ are globally uniform sampling threshold parameters and D is a globally uniform average sample separation distance which may be adjusted to control the global sampling density.

Figure 5:
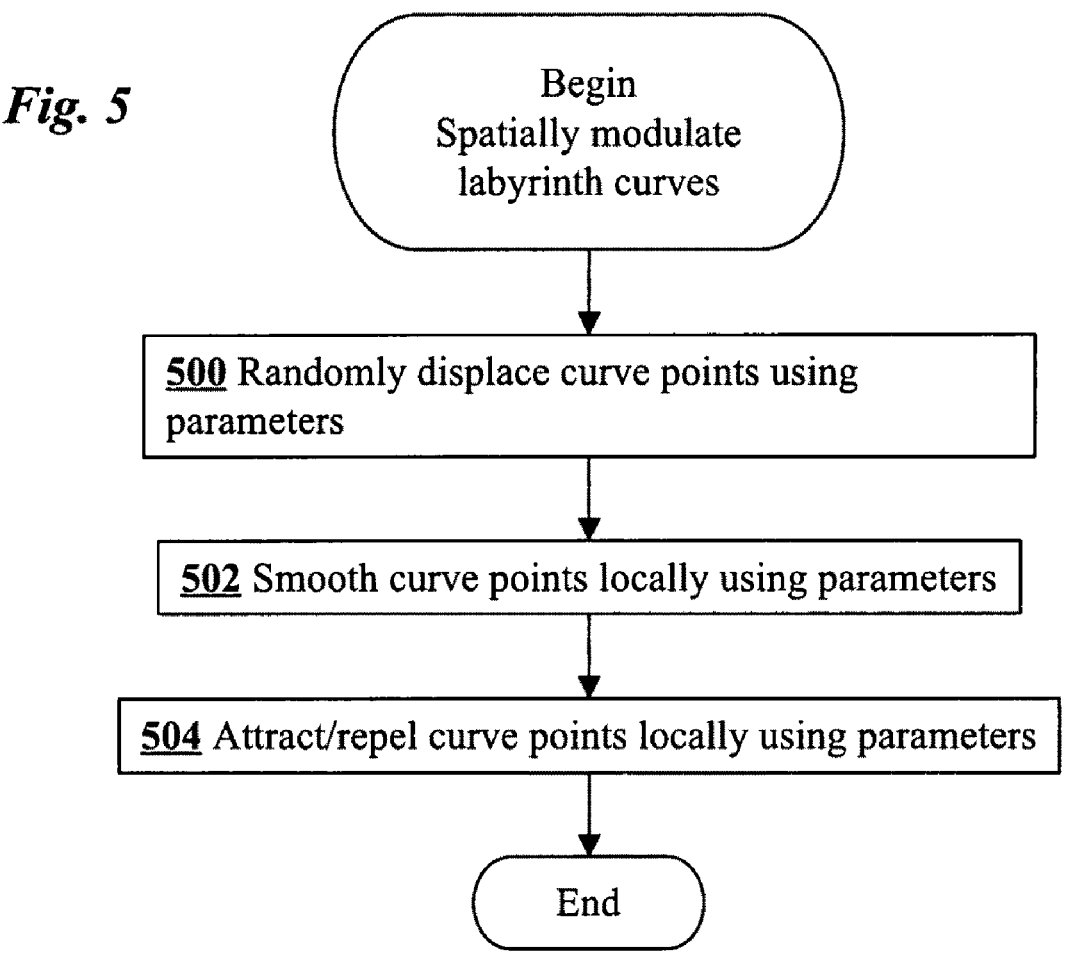
FIG. 5 is a flow chart illustrating steps of a curve evolution routine, according to an embodiment of the present invention.

In addition to user modifications and curve resampling, each iteration also includes a key step of the curve evolution in which the curve is spatially modulated by the curve evolution parameters. The main steps of this spatial modulation are shown in FIG. 5. It involves computing a random displacement for each of the sample points of the curve, as shown in step 500, computing a smoothing displacement for each of the sample points of the curve, as shown in step 502, and computing an attraction-repulsion displacement for each of the sample points of the curve, as shown in step 504.

Figure 8:
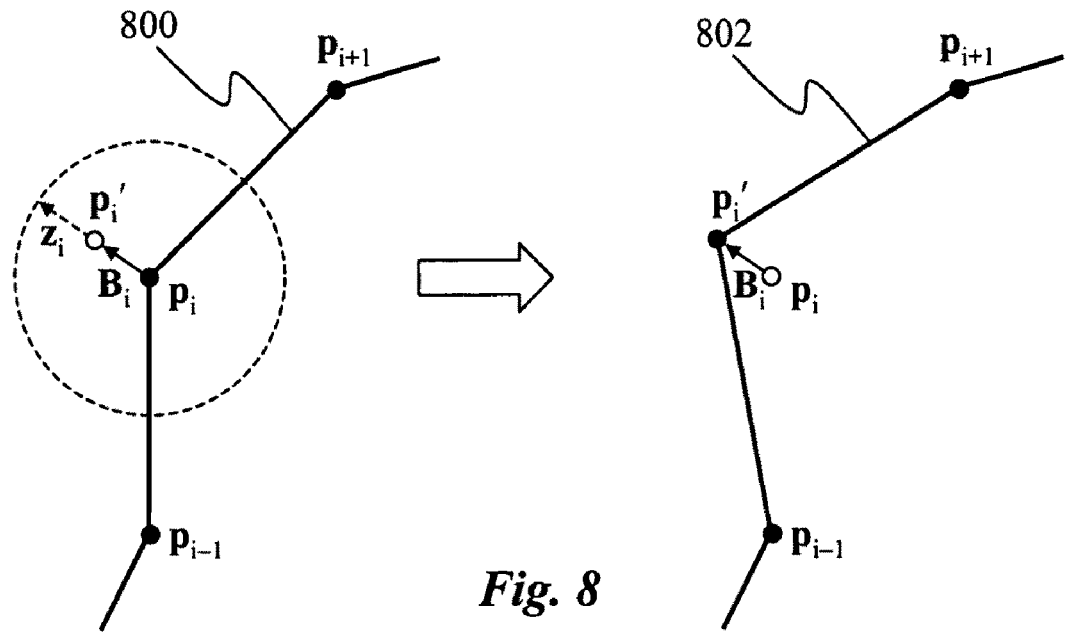
FIG. 8 is a diagram illustrating a random displacement of a sample point on a curve, according to an embodiment of the present invention.

FIG. 8 is a diagram illustrating a random displacement of a sample point $p_i$ on a curve, changing curve 800 before the displacement of sample point $p_i$ to curve 802 after the sample point $p_i$ is randomly displaced to its new position $p_i'$ by a random displacement vector $R_i$. The random displacement preferably simulates a Brownian motion. It may be computed from a stochastically selected random offset vector $z_i$ whose magnitude is scaled by the average point displacement parameter D, the spatially-dependent scaling function $\delta$, and a spatially-dependent randomness strength function $f_R$ defined on the evolution space. For example, $$R_i = f_R(p_i) \cdot \delta(p_i) \cdot D \cdot z_i.$$

The function $f_R$, like $\delta$, is a positive real-valued function whose values depend on the sample point. Thus, it serves to spatially modulate the random displacements of the curve so that sample points on the curve experience larger or smaller random displacements depending on their locations in the evolution space. If the values of are defined by an image, for example, the evolved curve will have more randomness in areas corresponding to larger intensities in the image.

Figure 9:
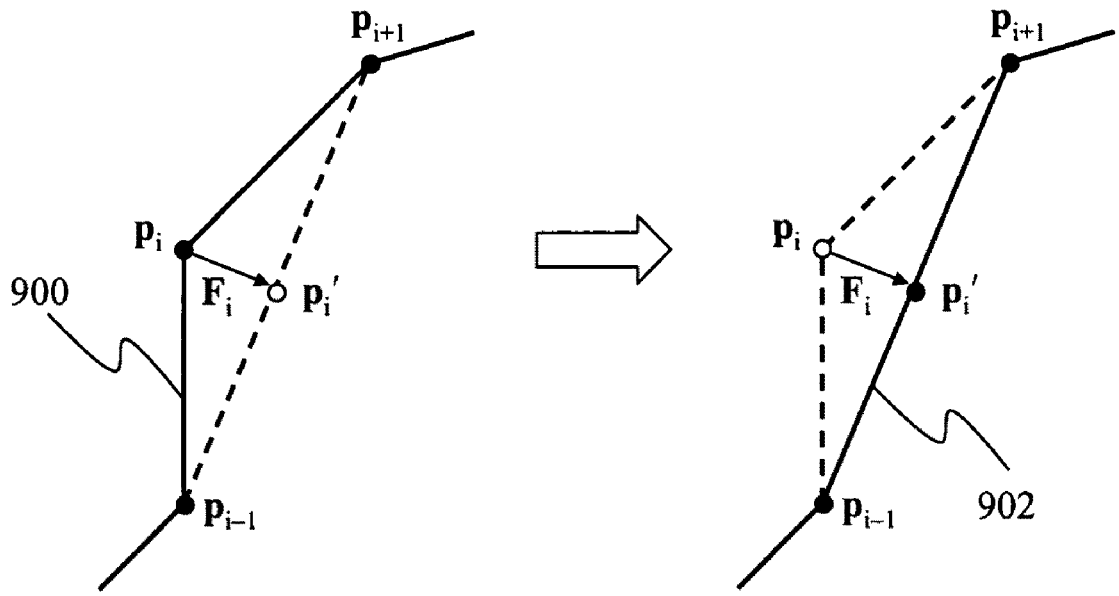
FIG. 9 is a diagram illustrating a smoothing displacement of a sample point on a curve, according to an embodiment of the present invention.

FIG. 9 is a diagram illustrating a smoothing displacement of a sample point $p_i$ on a curve, changing curve 900 before smoothing displacement of sample point $p_i$ to curve 902 after the sample point $p_i$ is displaced to its new position $p_i'$ by a smoothing displacement vector $S_i$. This displacement vector may be computed from a weighted average of adjacent points, scaled by a spatially-dependent smoothness function $f_S$ defined on the evolution space:

$$S_i = f_S(p_i) \cdot \{[\delta(p_{i+1}) \cdot p_{i-1} + \delta(p_{i-1}) \cdot p_{i+1}]/[\delta(p_{i+1}) + \delta(p_{i-1})] - p_i\}.$$

Because the function $f_S$ is a positive real-valued function whose values depend on the sample point, it serves to spatially modulate the smoothness displacements of the curve so that sample points on the curve are more or less smoothed depending on their locations in the evolution space. Note also that the average of the two adjacent points is weighted by the spatially-dependent scaling function $\delta$, so that this also provides spatial modulation of smoothness.

Figure 10:
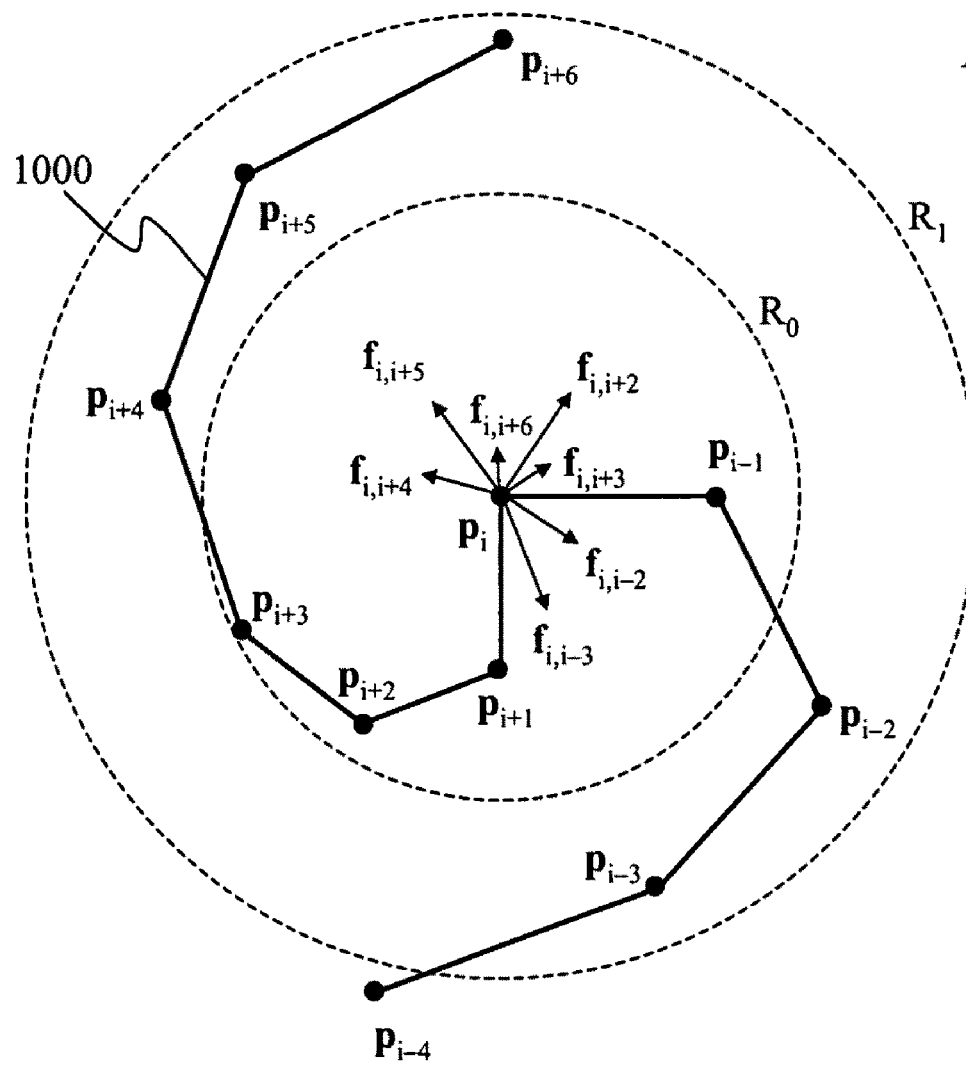
FIG. 10 is a diagram illustrating an attraction-repulsion displacement of a sample point on a curve, according to an embodiment of the present invention.

FIG. 10 is a diagram illustrating an attraction-repulsion displacement of a sample point $p_i$ on a curve 1000. A net attraction-repulsion displacement $A_i$ for point $p_i$ is a vector sum of a set of attraction-repulsion displacements $\{f_{i,j}\}$ between $p_i$ and a set of neighboring points $p_j$, scaled by a spatially-dependent attraction-repulsion strength function $f_A$ defined on the evolution space:

$$A_i = f_A(p_i) \cdot \sum_j f_{i,j},$$

where the sum is over all indices j of points $p_j$ located in a neighborhood of point $p_i$. A point $p_j$ is included in this neighborhood of $p_i$ if the distance between the two points is less than a predetermined radius of attraction $R_1$, i.e., $r_{i,j} = |p_i - p_j| < R_1$. Preferably, the adjacent points $p_{i-1}$ and $p_{i+1}$ are not included in the neighborhood so as to avoid numerical instabilities. The computed attraction-repulsion displacement $f_{i,j}$ between two points on the curve is an attraction if the two points are separated by a distance greater than a predetermined transition distance $R_0 < R_1$. If the two points are separated by a distance less than $R_0$, then the displacement is a repulsion. That is, if $R_1 < r_{i,j}$ or $j = i \pm 1$ then $f_{i,j}$ is zero if $0 < r_{i,j} < R_0$ then $f_{i,j}$ is a repulsion if $R_0 < r_{i,j} < R_1$ then $f_{i,j}$ is an attraction.

Preferably, the values of $R_0$ and $R_1$ are functions of the spatially dependent scaling function $\delta$, the average sample point separation distance D, and global threshold parameters $k_0$ and $k_1$. For example, local values of $R_0$ and $R_1$ used to compute $f_{i,j}$ may be calculated from the equations $$R_0 = \min\{\delta(p_i), \delta(p_j)\} \cdot D \cdot k_0$$

$$R_1 = \min\{\delta(p_i), \delta(p_j)\} \cdot D \cdot k_1.$$

The displacements $f_{i,j}$ therefore are spatially modulated by the scaling function $\delta$. In addition, the net attraction-repulsion displacement $A_i$ is scaled by the spatially-dependent function $f_A$. Consequently, the displacement $A_i$ is spatially modulated, resulting in local variations of the attraction-repulsion displacements during evolution.

Figure 11:
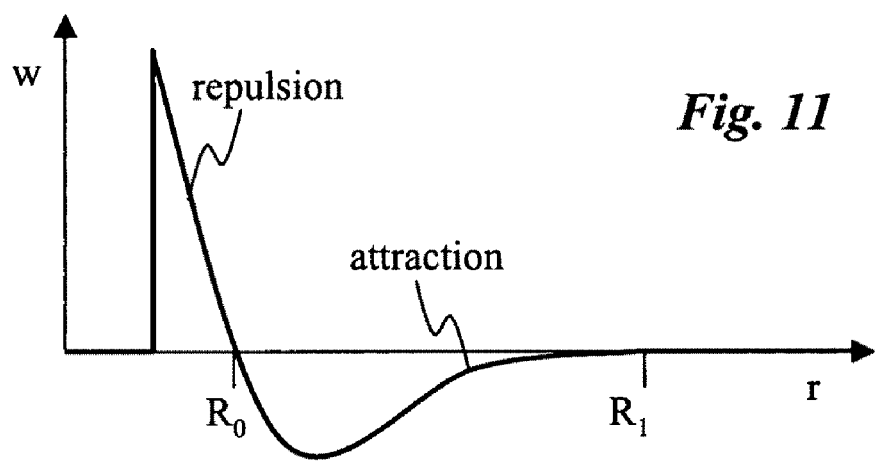
FIG. 11 is a graph of displacement w vs. point separation distance r illustrating how the strength of attraction-repulsion displacement varies with distance between points, according to an embodiment of the present invention.

The magnitude of the attraction-repulsion displacement $f_{i,j}$ between two points may be computed from a predetermined function w that maps point separation distance r to an attraction-repulsion displacement value. For example, FIG. 11 is a graph of displacement w vs. point separation distance r illustrating how the strength of attraction-repulsion displacement varies with distance r between points. A function w having this form may be conveniently calculated from a Lennard-Jones potential:

$$w(r) = (\sigma/r)^{12} - (\sigma/r)^6,$$

where $\sigma$ is a parameter controlling the shape of the function. The shape of this function w as well as the values of $k_0$ and $k_1$ may be considered evolution parameters that can be initialized with different values and adjusted during curve evolution.

In preferred implementations, computing the attraction-repulsion displacement for a given point involves determining all curve points within a given neighborhood of that point (e.g., all points less than a predetermined distance from the point). A spatial data structure, preferably a k-d tree, is used to accelerate this determination.

In some embodiments, to modulate curve orientation the net attraction-repulsion displacement $A_i$ is modified according to a gradient field $\nabla f_G$ defined on the evolution space. This gradient field may be defined directly or derived from an anisotropy function $f_G$. In one implementation, the modified attraction-repulsion displacement $A_i'$ may be calculated by scaling $A_i$ in the direction of a gradient field $\nabla f_S$ according to $$A_i' = A_i + (\nabla f_G(p_i) \cdot A_i)(\nabla f_G(p_i)/|\nabla f_G(p_i)|).$$

Figure 14B:
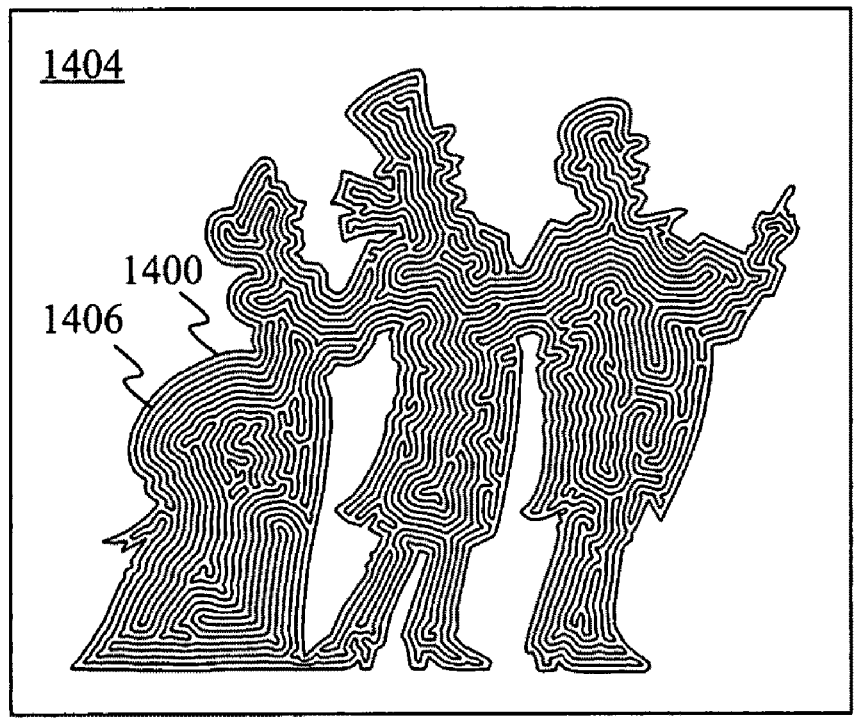

An illustration of an evolved curve modulated by anisotropy is shown in FIG. 14B. In that example, the anisotropy function is defined as the distance to the nearest boundary. Consequently, the labyrinth curves evolve to align more parallel to the boundary than they otherwise would.

If the curve network includes a boundary, the net attraction-repulsion displacement $A_i$ for a point $p_i$ on the curve also includes displacements $f_{i,j}$ between the sample points of the curve and boundary sample points in the neighborhood of $p_i$. These curve-boundary displacements $f_{i,j}$ may be computed using the same technique described above for curve-curve displacements. However, if the curve network contains a boundary gap, then the curve-boundary displacement calculation is modified so that the attraction-repulsion between the sample points of the curve and the boundary sample points for boundary sample points in the boundary gap is weakened. If a boundary gap is defined to reduce the boundary strength to zero, the effect of this weakening is to allow the curve to evolve across the boundary.

Figure 22A:
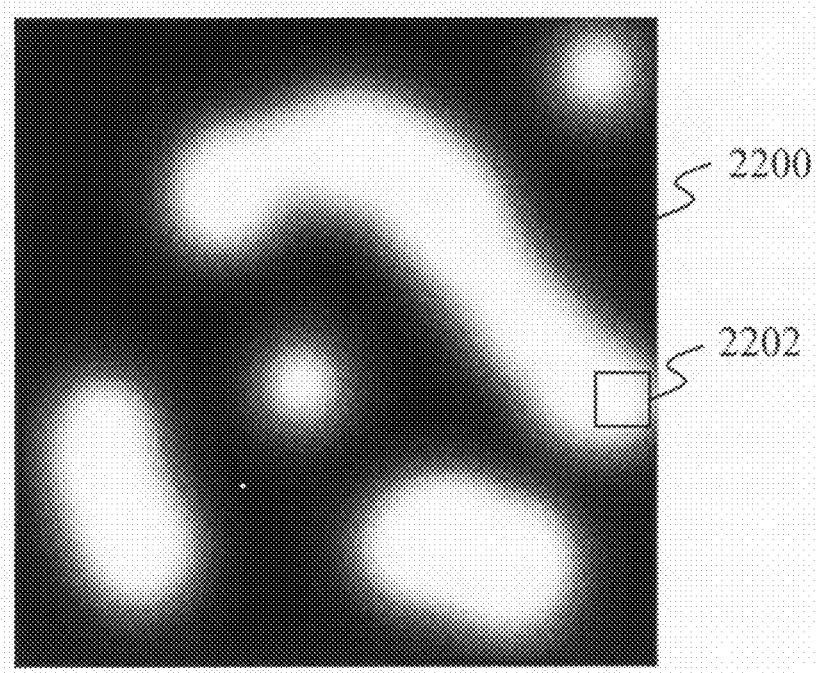
FIGS. 22A-B are diagrams illustrating a curve evolution function and a resulting labyrinth curve spatially modulated by the function.
Figure 22B:
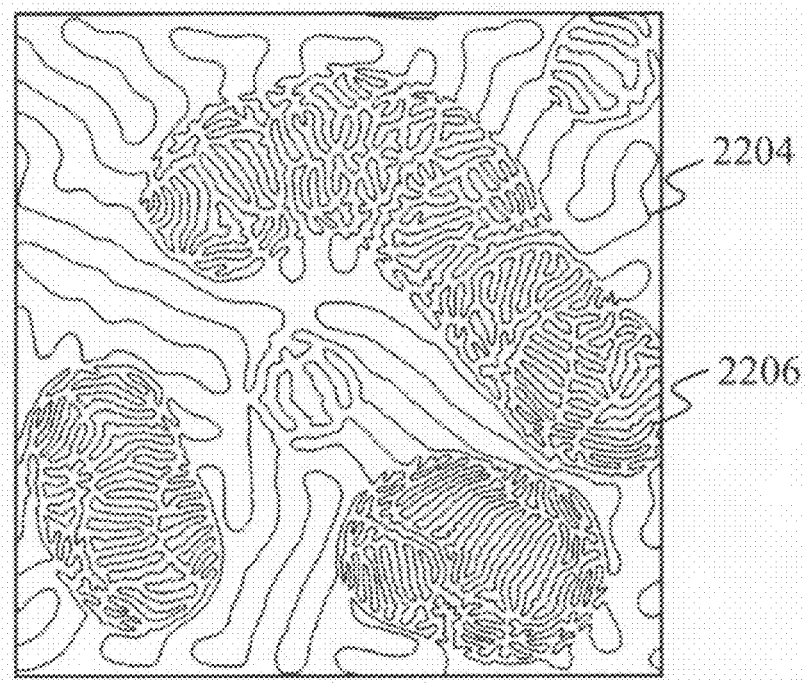

An illustration of how evolution parameters can spatially modulate the evolution of a labyrinth curve is shown in FIGS. 22A-B. The image shown in FIG. 22A is used to define spatially-dependent scaling function $\delta$ used as one of the curve evolution functions to evolve a curve in a plane. Darker portions of the image such as the portion contained in square 2200 correspond to small values of the function $\delta$ while lighter portions of the image such as the portion contained in square 2202 correspond to large values of the function $\delta$. FIG. 22B shows an evolved labyrinth curve spatially modulated by the function $\delta$ shown in FIG. 22A. As is evident from a visual comparison of the figures, where the function $\delta$ has larger values, the curve is modulated more at smaller scales resulting in a higher level of detail. For example, portion 2204 of the curve has a lower level of detail due to the low-intensity of corresponding portion 2200 of the image, and portion 2206 of the curve has a higher level of detail due to the high-intensity of corresponding portion 2202 of the image. To obtain an evolved labyrinth such as that shown in FIG. 22B, the function $\delta$ is preferably first set to 1.0 everywhere. After a coarse set of curves has evolved to fill the evolution space, the function $\delta$ is changed to have the values shown in FIG. 22A, so that some regions have values of $\delta$ less than 1.0. The curve evolution is then continued with the new $\delta$ parameter until the curve network is stable. Alternatively, the function $\delta$ can be gradually changed in a step-wise manner from a uniform 1.0 value to the non-uniform distribution shown in FIG. 22A. Specifically, after the function $\delta$ is changed by one step, the curve evolution is continued until the evolved curve has stabilized, and then $\delta$ is changed by another step. This step-wise evolution is repeated until the labyrinth has reached the desired complexity.

Figure 15:
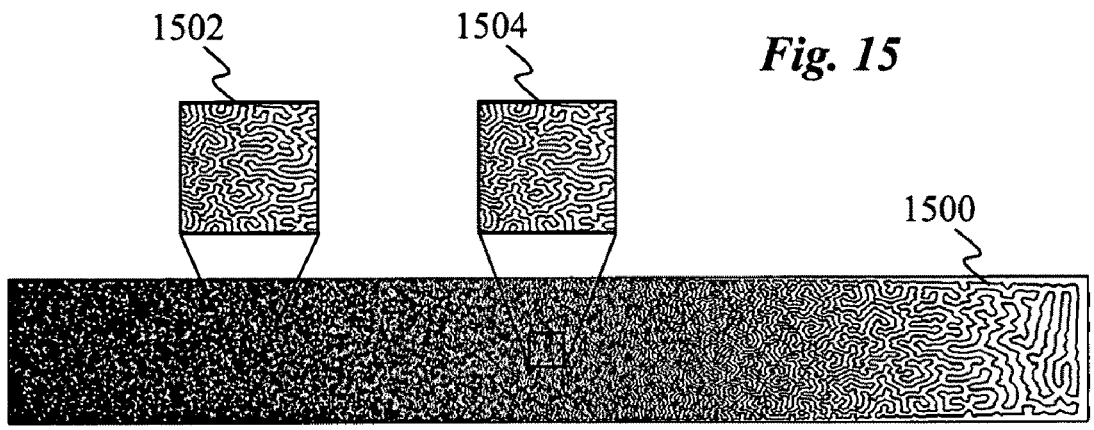
FIG. 15 is a diagram of an evolved curve spatially modulated by a monotonic function to illustrate half-toning using labyrinth curve, according to an embodiment of the present invention.
Figure 16:
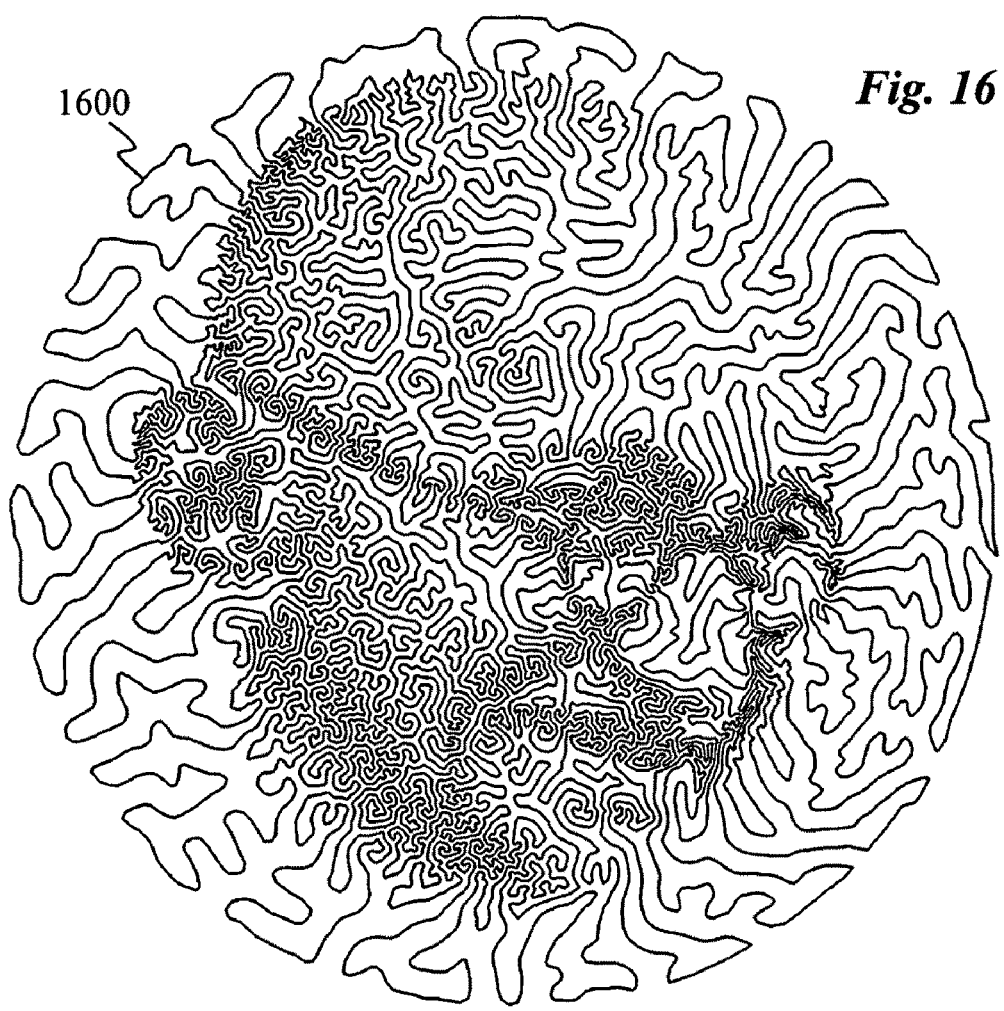
FIG. 16 is a diagram of an evolved curve spatially modulated by a function derived from an image, according to an embodiment of the present invention.

In a similar application, FIG. 15 is a diagram of an evolved curve 1500 that has been spatially modulated by a scaling function $\delta$ that is constant vertically and monotonically decreases horizontally from left to right. Consequently, the evolved curve 1500 has a high density of detail on the left in portion 1502, gradually decreasing toward the right in portion 1504. This example illustrates how labyrinth curves can be used for half-toning applications. A practical application of this principle is shown in FIG. 16 which contains a diagram of an evolved curve 1600 that has been spatially modulated by a scaling function $\delta$ derived from an image. In this case, the values of the function $\delta$ are obtained from the negative image, so that high intensities (lighter areas) in the original image result in a low level of curve detail, while low intensities (darker areas) in the original image result in a high level of curve detail.

Figure 6:
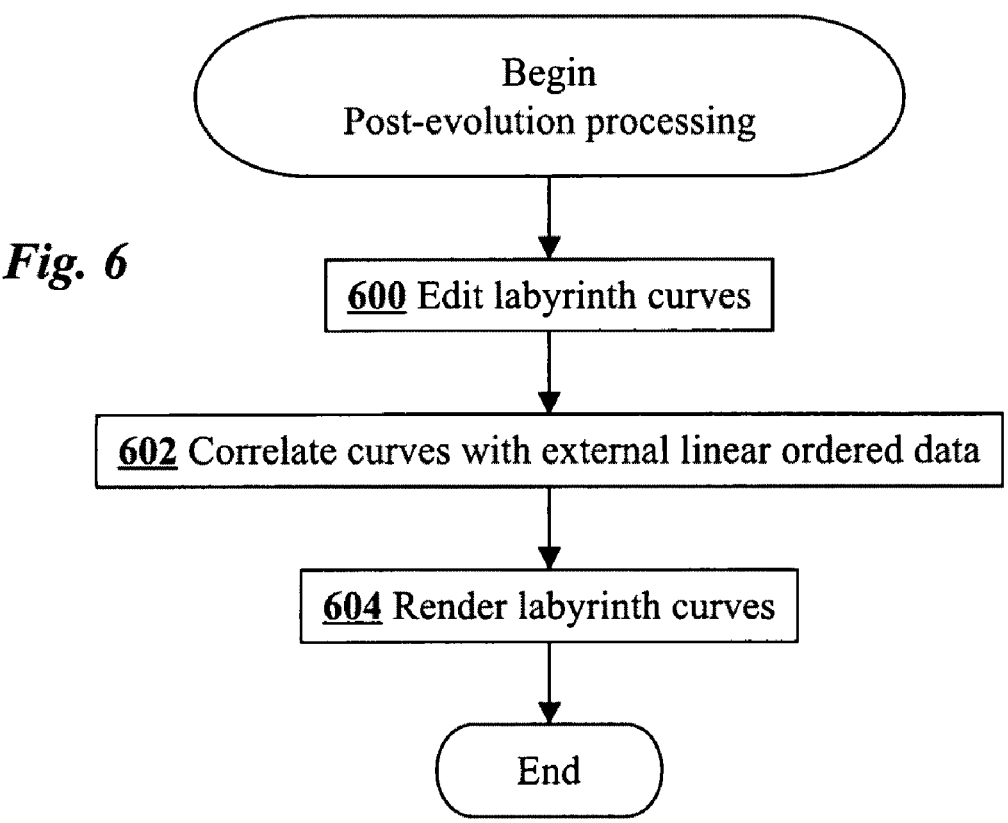
FIG. 6 is a flow chart illustrating steps of a post-evolution process, according to an embodiment of the present invention.
Figure 18:
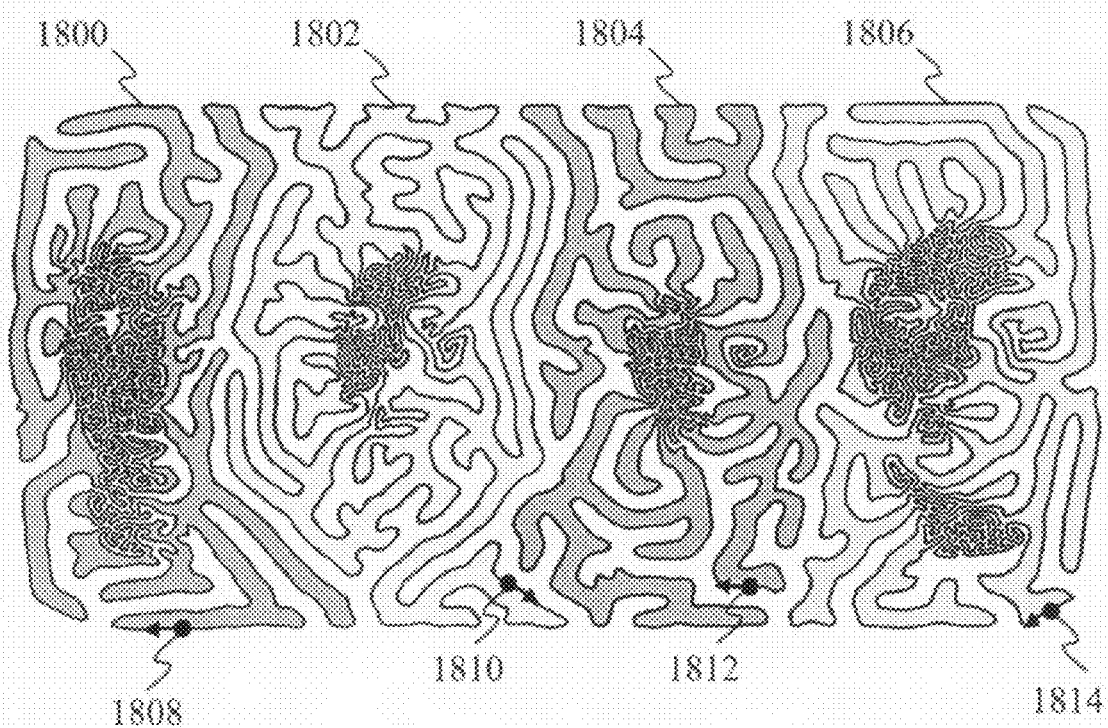
FIG. 18 is a diagram illustrating four evolved curves spatially modulated by images of four musicians implementing a user interface for navigating four audio tracks, according to an embodiment of the present invention.

Evolved curves produced by the iterative evolution process may be further edited and/or processed to be used for various applications. For example, FIG. 6 is a flow chart illustrating steps of one post-evolution process for applications in which an evolved curve is used to parameterize a set of linearly ordered data. In step 600 the evolved labyrinth may be edited if desired to suit the particular application. The edited curve is then mapped to a set of linearly ordered data in step 602, i.e., by linearly mapping distances along the length of the evolved curve to the linearly ordered data in a one-to-one correspondence. In step 604 the curve is then rendered and can be used to provide a user interface allowing the linearly ordered data to be navigated using the rendering of the evolved curve. For example, FIG. 18 is a diagram illustrating four evolved curves 1800, 1802, 1804, 1806 spatially modulated by four images of four musicians. These evolved curves are then separately mapped to four audio tracks. The rendered curves and the mapping may then be used to implement a user interface for navigating the audio. For example, the currently playing section of each audio track may be indicated by four dots 1808, 1810, 1812, 1814 which move along the lengths of the four curves 1800, 1802, 1804, 1806, respectively, as the tracks play. The user may drag the dots to different positions along the curve to change the currently playing section of the audio tracks. The rendered curves may also be modulated by the audio track signals in real time as the audio tracks play. For example, the intensity of the region enclosed by a rendered curve can be increased in proportion with the volume level of the currently playing audio of the track mapped to the curve.

Since the evolved curves are represented as line segments, they can be saved as vector art to a data file on a storage medium, such as a hard drive or CD-ROM, and used as a stippling stitch design applicable to embroidery using computerized sewing machines. Preferably, in such applications the evolved curve network constitutes the boundaries of closed polygons that can be embroidered in different colors and textures. Textures can be modified by varying stitch types and parameters.

Figure 17:
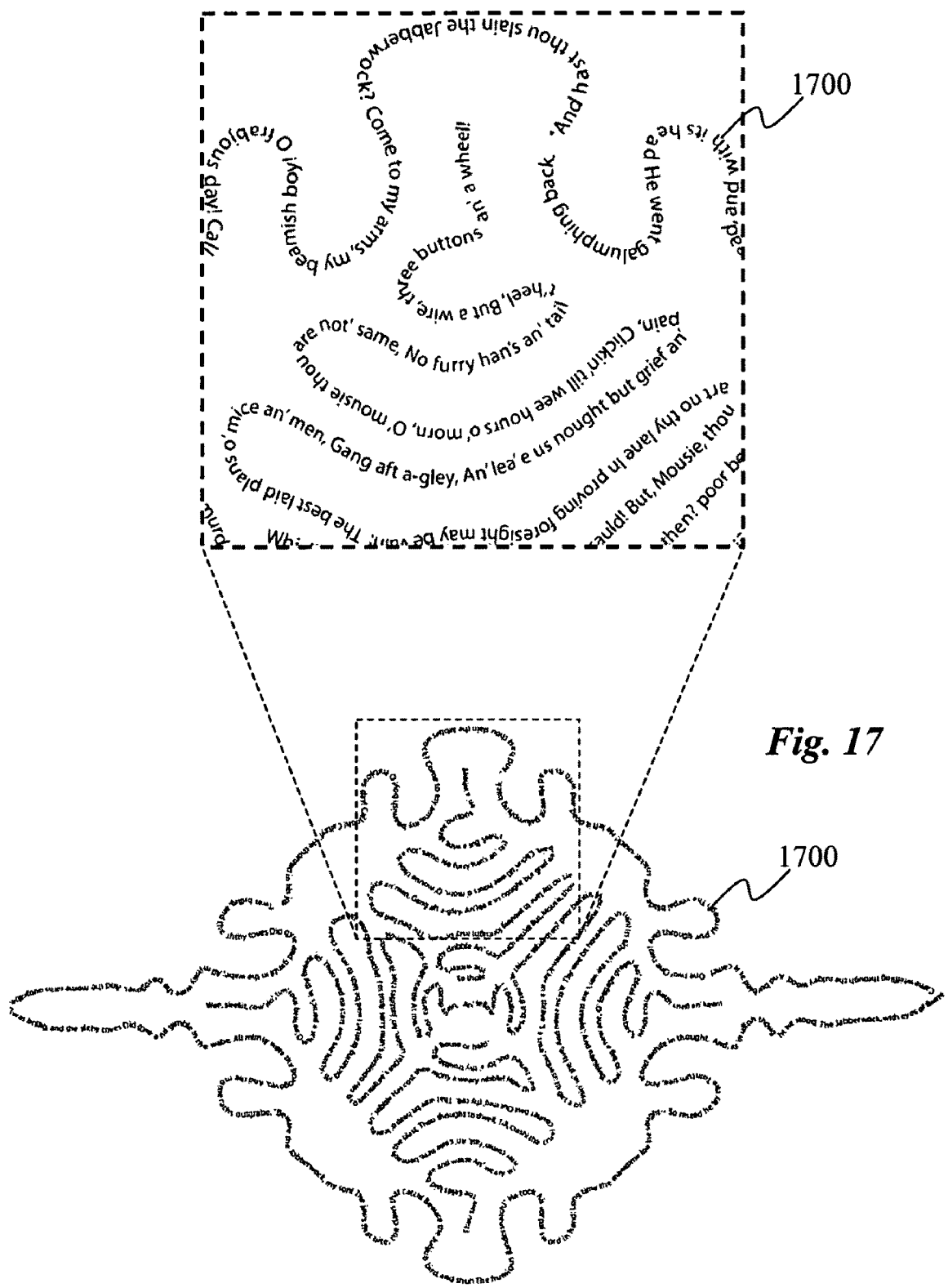
FIG. 17 is a diagram illustrating an evolved curve rendered by linearly mapping a string of text to the evolved curve, according to an embodiment of the present invention.

Another application involving linear mapping to an evolved curve is illustrated in FIG. 17. In this example, an evolved curve is rendered by linearly mapping a string of text 1700 to the evolved curve. Each character of the text string is appropriately scaled and oriented to correspond with the alignment of the portion of the evolved curve to which it is mapped. The curve could be further mapped to an audio track of a reading of the text, or music in the case where the text string is musical lyrics. In one application, a user interface plays the audio track while the corresponding characters or words are animated.

The labyrinth curves can be used in the context of animation in at least two ways. First, the evolution process of curves from an initial configuration to a final one can be animated. FIGS. 29A-F show five initial curves transforming into a portrait labyrinth. For example, initial curve 2900 evolves through intermediate curves 2902, 2904, 2906, 2908 to produce the evolved curve 2910. Second, labyrinth curves can be animated by using video images instead of a still image as evolution parameter functions. For example, a new labyrinth may be created and played back for each frame of video with frame-to-frame coherence of the algorithm's parameters. An example of such frame-to-frame coherence would be the key framing of the initial labyrinth curves, boundary and boundary gap curves.

Figure 30A:
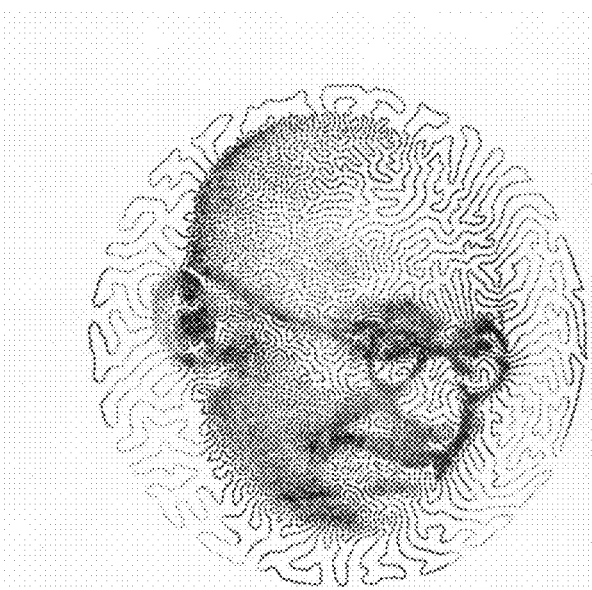
FIGS. 30A-D are diagrams that illustrate how an image can be used to color the geometry of a curve evolved from a different image.
Figure 30B:
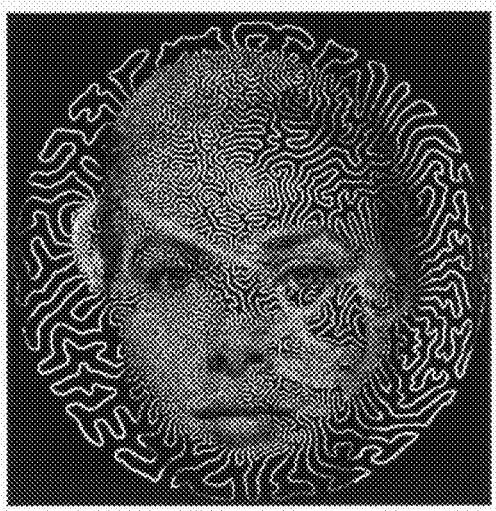
Figure 30C:
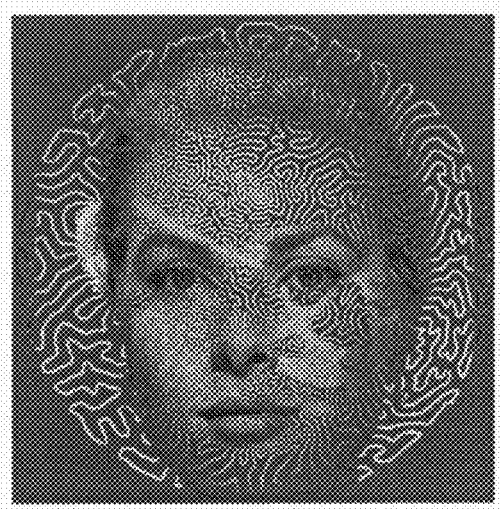
Figure 30D:
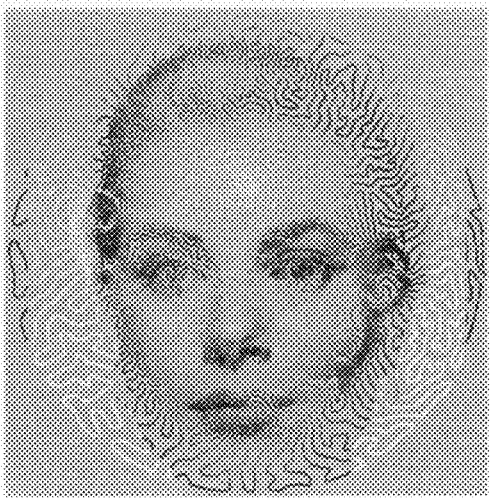
Figure 36A:
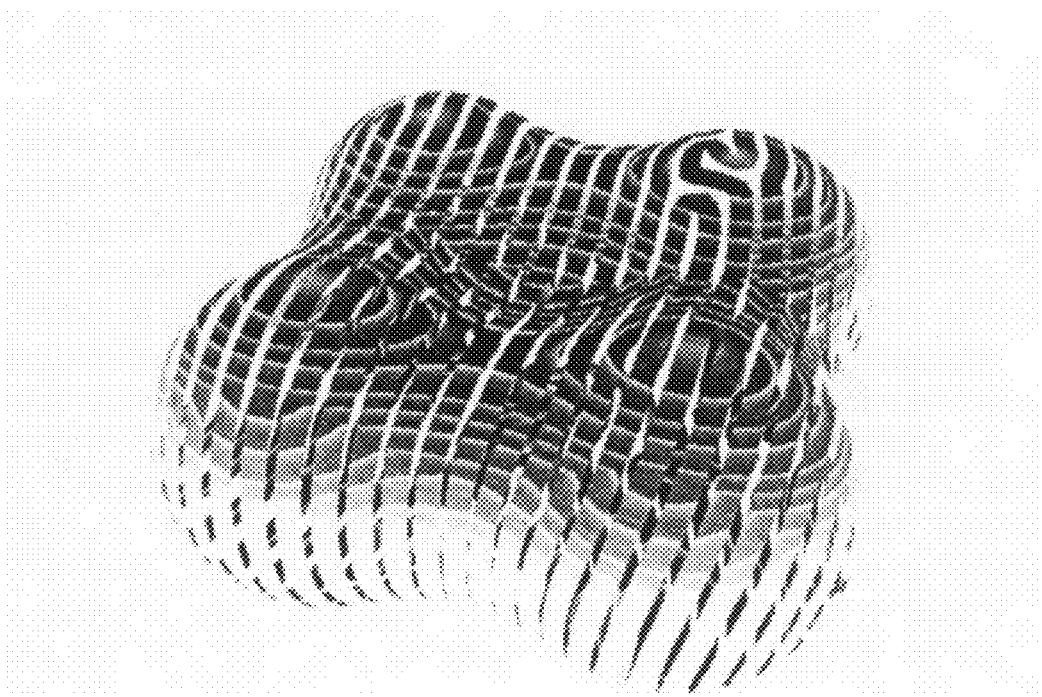
FIGS. 36A-B are diagrams illustrating evolved curves on non-Euclidean surface geometry, which can be used as a model to create stylized sculptures of 3D objects.
Figure 36B:
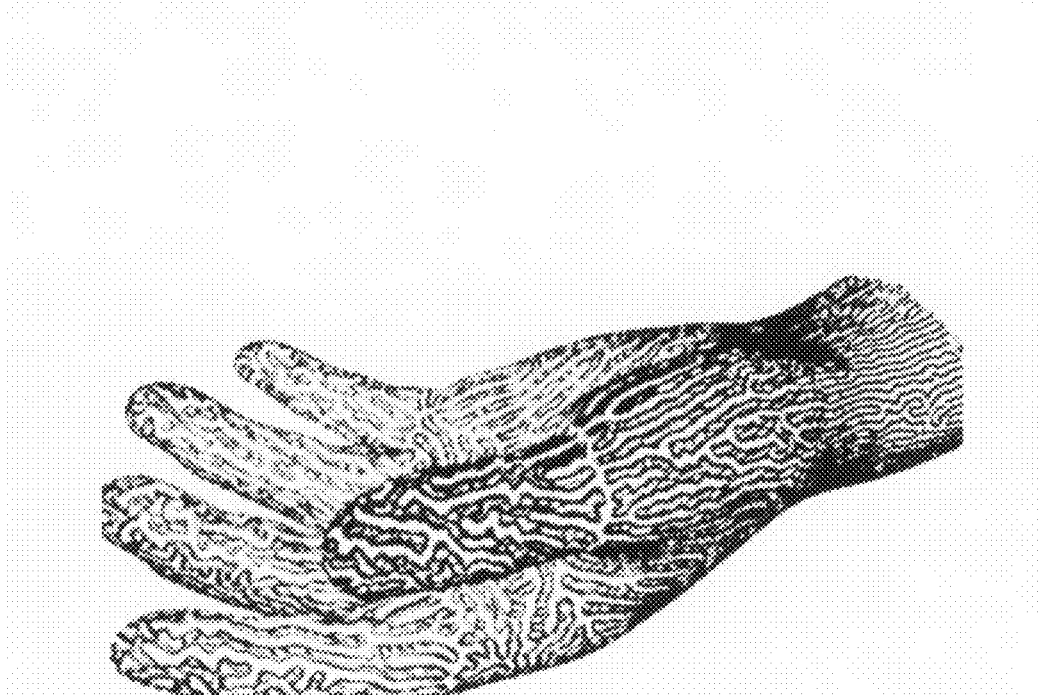

The rendering of an evolved curve may also be performed by selecting intensity values for rendered points of the evolved curve (and/or for points enclosed by the evolved curve) from corresponding points of an image projected onto the evolution space. The image may be, for example, the same image used to define a spatially-dependent evolution parameter, in which case the rendering may enhance the visual half-toning effect of the spatial modulation. Alternatively, the image used for rendering may be a different image, in which case the rendered curve acquires image properties independent of the shape of the evolved curve. This application may be considered as a mapping of the 2D image data to the 1D evolved curve, analogous to the mapping of 1D linear data to the 1D evolved curve as discussed above in relation to FIGS. 17 and 18. A two-dimensional example of this is shown in FIGS. 30A-D. Here, a female portrait image is mapped to the labyrinth curves shown in FIG. 29A to produce the rendered labyrinth of FIG. 30A whose shade of gray at any point is determined from the female portrait image. Varying the background color as shown in FIGS. 30B-D alters the contrast, controlling the perceptual prominence of the image used to evolve the labyrinth curve as compared to portrait image used to render the labyrinth curve. Similarly, three dimensional data may be mapped onto an evolved curve in a three dimensional evolution space, as shown in FIGS. 36A-B.

The algorithm for evolving labyrinth curves in the plane can be used directly on three dimensional surfaces. In three dimensions, all displacements are computed as three dimensional vectors instead of two dimensional vectors, and all sample points on curves remain constrained to the surface. In addition, boundaries and boundary gaps are two dimensional surfaces rather than one dimensional curves. The generalization from two dimensions to three dimensions is more complicated, but straightforward. Displacing a point on a surface is a well studied problem in geometry. Different techniques exist for surface representations such as meshes, parametric surfaces (such as NURBS), and algebraic surfaces. In each case, the displacement vector is projected to the tangent plane of the surface and a numerical integration scheme is used to the move point along the surface in the direction of the projected displacement. These techniques are well studied and known by skilled engineers familiar with three dimensional geometry algorithms.

Whereas the curve evolution parameters preferably are represented by images in the two dimensional case, the functions are preferably stored in (u,v)-texture maps or with mesh vertices for surfaces. Data structures for representing functions as textures are widely used in the field of computer graphics.

Figure 7:
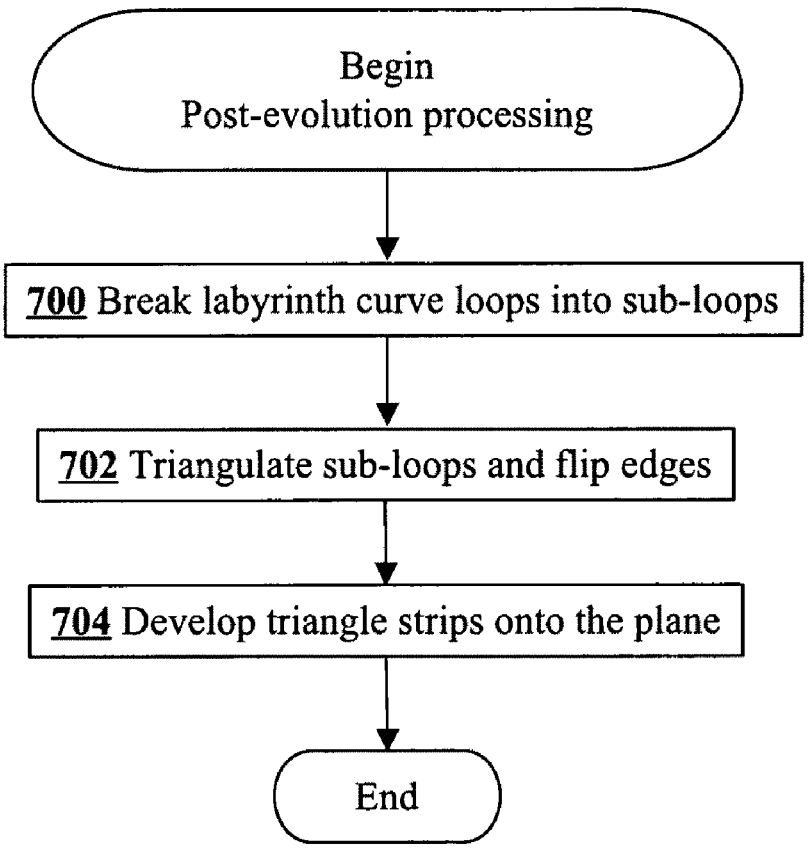
FIG. 7 is a flow chart illustrating steps of an alternate post-evolution process, according to an embodiment of the present invention.
Figure 19:
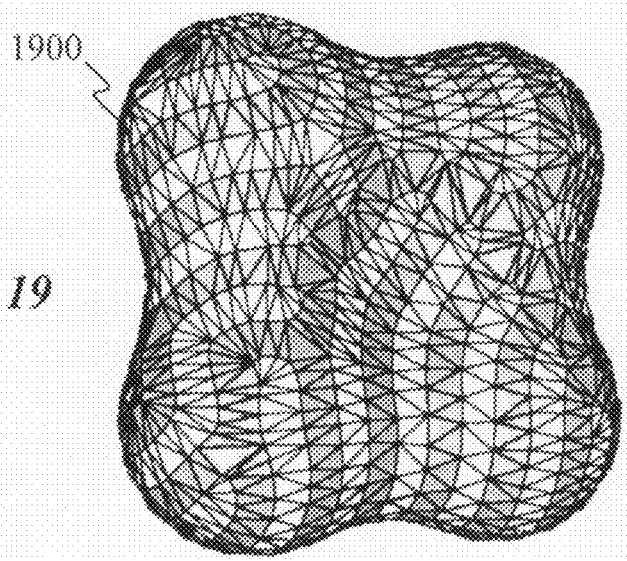
FIG. 19 is a diagram illustrating a developable surface generated by evolving a curve on a curved surface and then triangulating the resulting strips, according to an embodiment of the present invention.
Figure 20A:
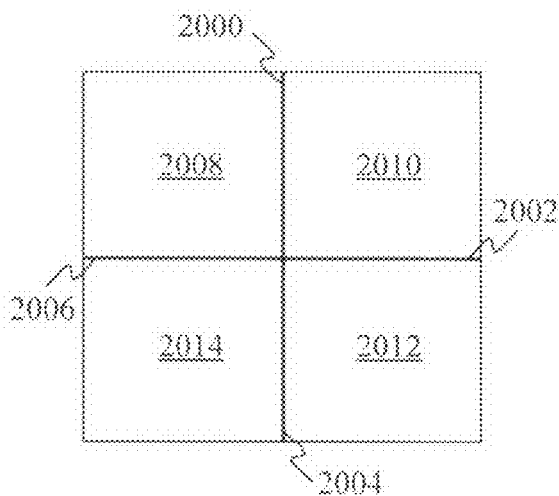
FIGS. 20A-D are diagrams illustrating four stages of a method for generating a pattern for a developable surface, according to an embodiment of the present invention.
Figure 20B:
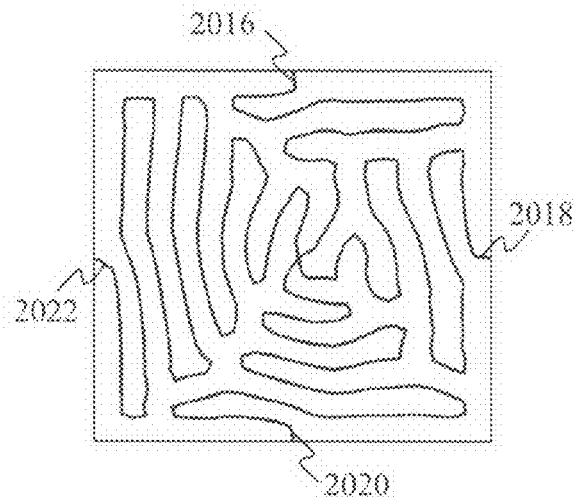
Figure 20C:
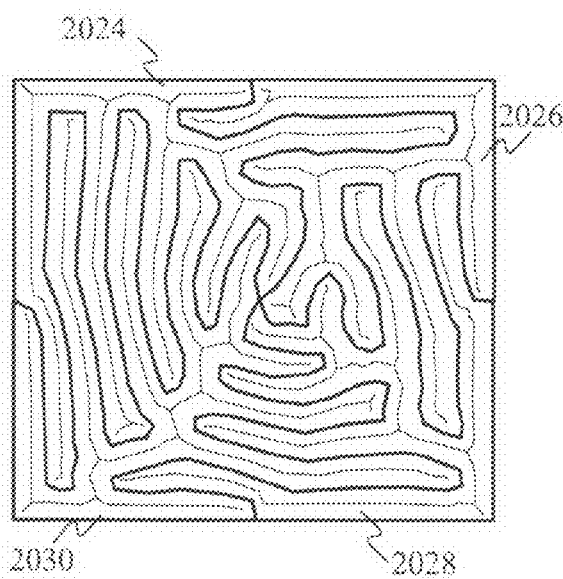
Figure 20D:
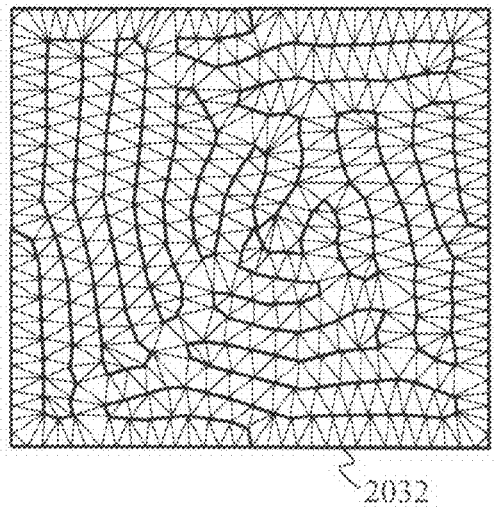

FIG. 7 is a flow chart illustrating steps of an alternate post-evolution process used for generating developable surfaces and/or patterns for making them. A developable surface is a two-dimensional surface which can be cut and unfolded onto a plane without stretching or distortion. In this case, the evolution space is typically a non-Euclidean surface containing a closed curve separating regions of the evolution space. For example, FIG. 19 is a diagram illustrating a developable surface generated by evolving a curve 1900 on a curved surface and then triangulating the resulting strips of the surface formed by the curve. The surface can be cut along the curve and the strips unfolded and laid flat on a plane, forming a pattern. The pattern can be used to cut a material which can then be folded and assembled by connecting the edges to produce a physical realization of the developable surface. FIGS. 20A-D are diagrams illustrating four stages of a method for generating a pattern for a developable surface. For simplicity of illustration, the developable surface in this case is a square. In FIG. 20A the square is shown with four initial curves drawn, dividing the square into four regions 2008, 2010, 2012, 2014. FIG. 20B shows the evolved curves 2016, 2018, 2020, 2022. FIG. 20C shows the four resulting strips 2024, 2026, 2028, 2030 corresponding to original regions 2008, 2010, 2012, 2014. FIG. 20D shows the same strips after they are triangulated with triangles such as triangle 2032.

Figure 23A:
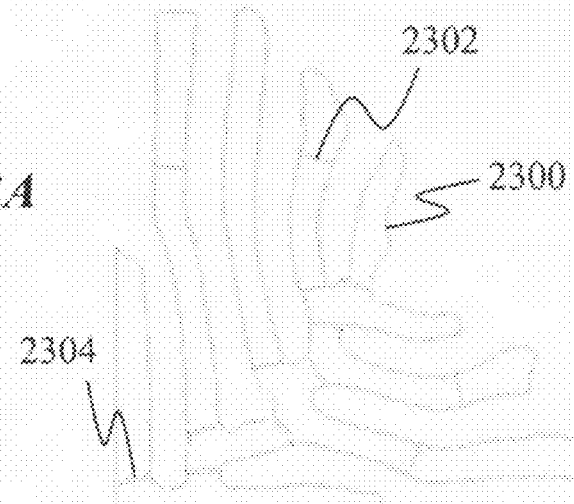
FIGS. 23A-C are diagrams illustrating the method for computing a triangulation from a curve loop.
Figure 23B:
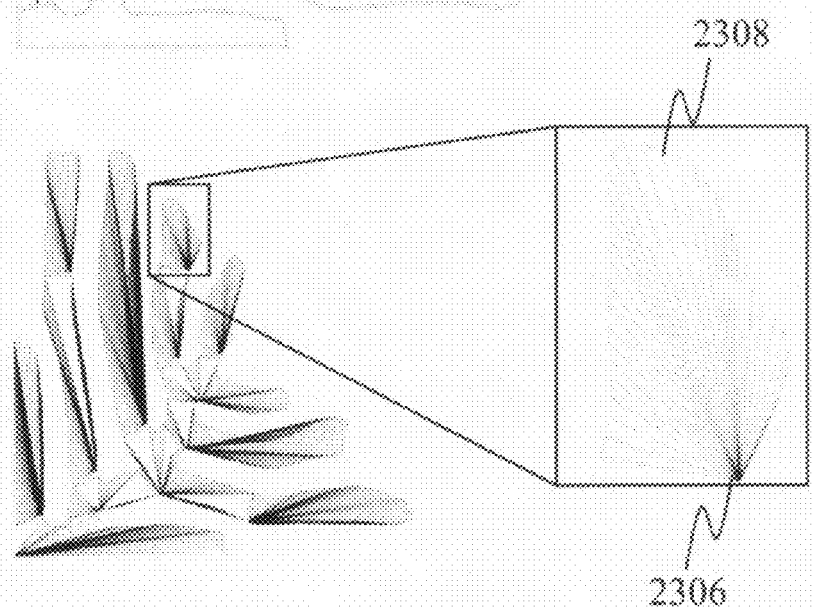
Figure 23C:
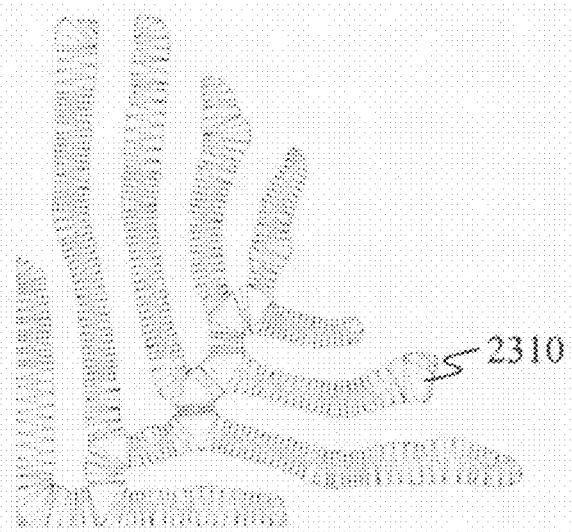

Creating a triangulation of a general 2- or 3-dimensional concave polygon can be done in three steps. First, the curve loop is divided into a number of smaller sub-loops by automatically inserting temporary line segments along the boundary. For example, FIG. 23A shows such a loop 2300 divided by line segments 2302 and 2304 into smaller subloops. Second, each sub-loop is triangulated by forming lines between a first point 2306 on the line segment 2302 and sample points, such as 2308, along the corresponding subloop, as shown in FIG. 23B. Third, an edge-flipping optimization is used to improve the aspect ratio of the triangles. Edges are flipped repeatedly to minimize the sum of the squares of the lengths of all interior edges, such as edge 2310. FIG. 23C shows a triangulation after this process.

Figures 24A, 24B, 24C, 24D, 24E:
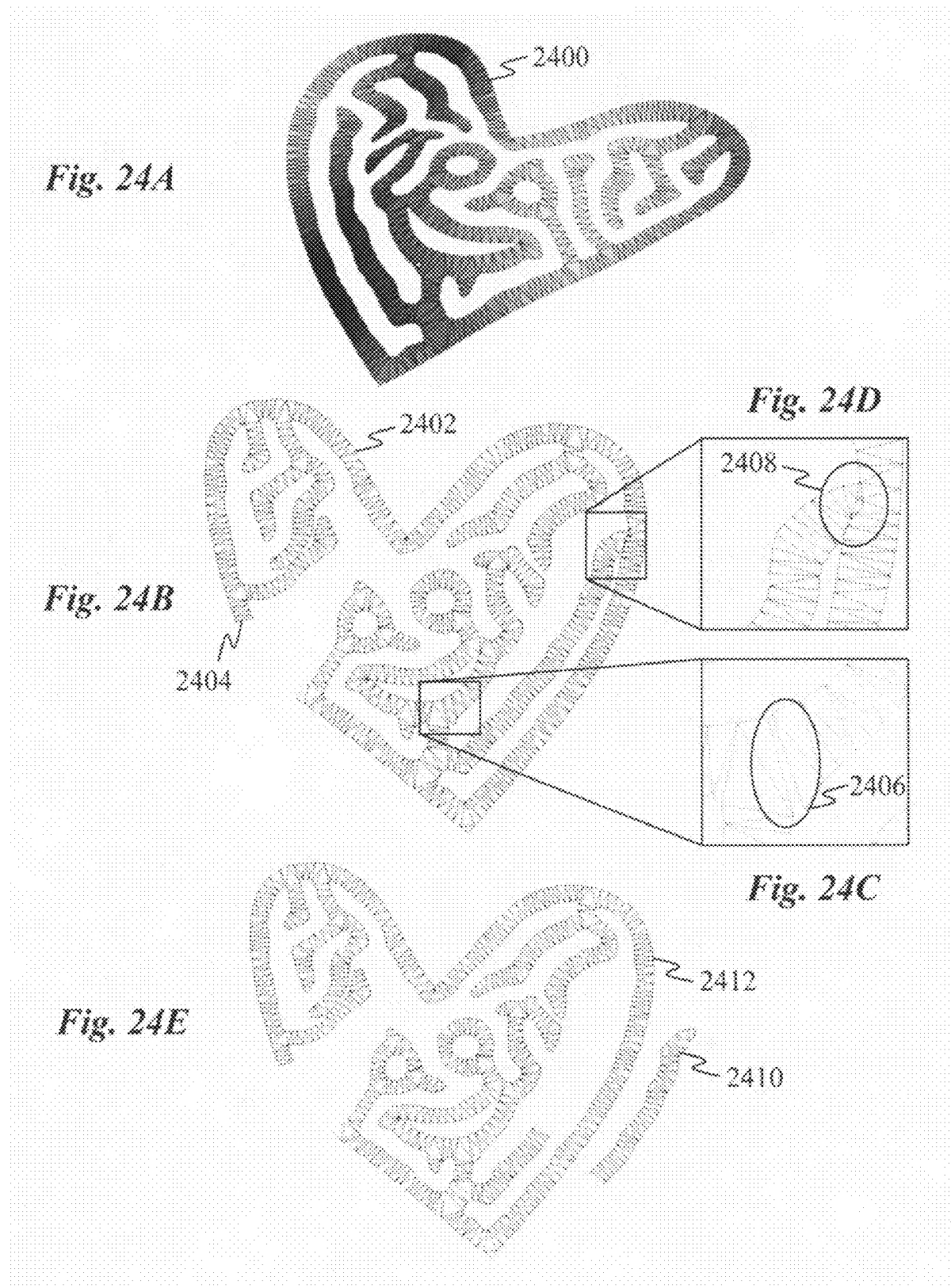
FIGS. 24A-E are diagrams illustrating the method for developing a three dimensional triangle strip onto the plane.

Typically, the developable surface is a non-Euclidean surface, in which case the triangulated strips are then projected onto a plane and cut to avoid self-intersections. FIG. 24A shows a triangle strip 2400 computed from a number of curve loops evolved on a non-Euclidean surface. Unfolding the strip 2400 on a plane produces a flat unfolded strip 2402, as shown in FIG. 24B. The unfolding may be performed by first selecting one triangle. Then, an adjacent triangle is unfolded onto the plane of the first triangle by rotating it around their shared edge. The process of unfolding is then repeated sequentially along the strips. Whenever a cycle is encountered during this process, the strip is cut along an edge. FIG. 24B shows one large cut at edge 2404; a smaller cut is shown in close-up on FIG. 24C, producing a gap between strips within the region indicated by oval 2406. The unfolding process may lead to self-intersecting triangles, as shown in the region indicated by oval 2408 of FIG. 24D. Such intersections are eliminated by breaking the strip into multiple pieces 2410 and 2412, as shown in FIG. 24E.

Figure 25A:
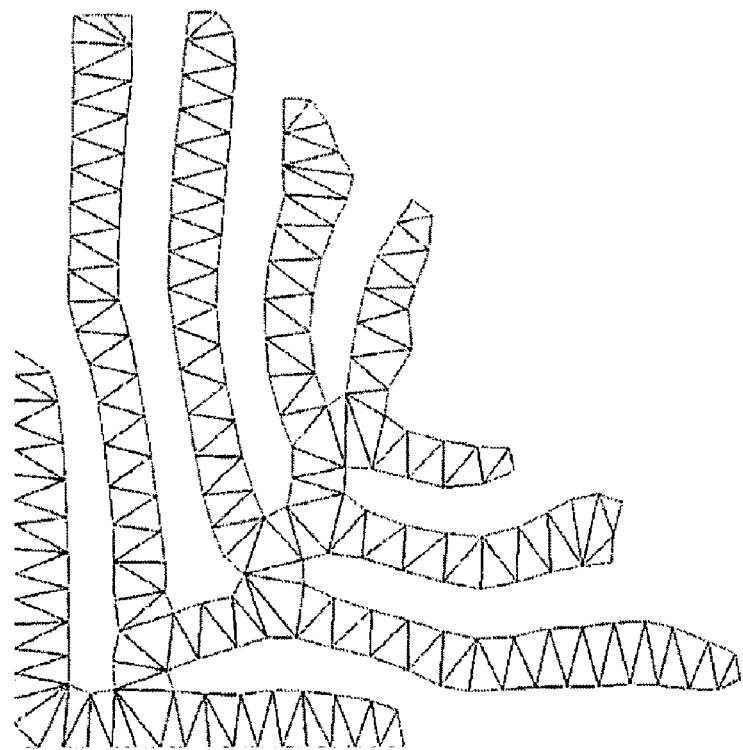
FIGS. 25A-B are diagrams illustrating post-processing of a curve loop to obtain a triangulation that is better suited for manufacturing of physical articles.
Figure 25B:
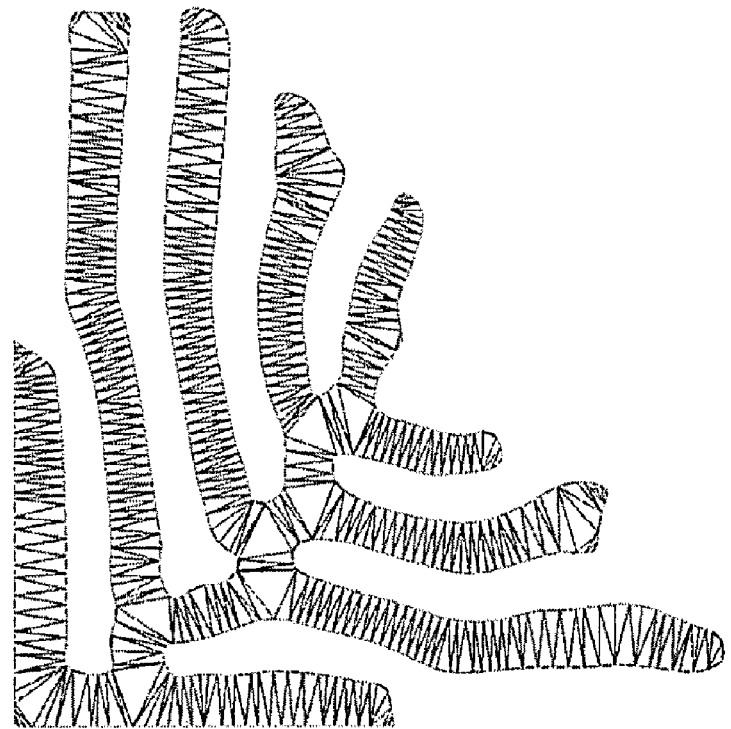

The projected strips may then be used as a pattern for generating a developable surface. Using such a pattern, an article of manufacture may be produced by cutting a material (e.g., fabric, sheet metal) using the unfolded strips as a pattern. The cut material is then bent at the triangulation lines, and edges of the resulting cut material are joined, producing a physical article resembling the original surface. Since materials like paper or sheet metal have a thickness and tension, strips cut in such materials are preferably shaped to appropriately compensate for these factors and would thus depart from being exactly like a triangle strip. The difference between the computed strips and the manufactured strips can be reduced by refining the strips by evolving the curve network with lower values of the resampling threshold parameters $k_{min}$ and $k_{max}$. FIG. 25A shows a two dimensional flattened triangulation of strips computed from a curve loop. FIG. 25B shows a flattened triangulation of the same strips computed from refined curves after lowering $k_{min}$ and $k_{max}$. For three dimensional triangle strips, the increased number of triangles means that the angle between the normal vectors of adjacent triangles is reduced. This produces strips that are easier to manufacture from stiff materials like plastic and metals.

Figure 26A:
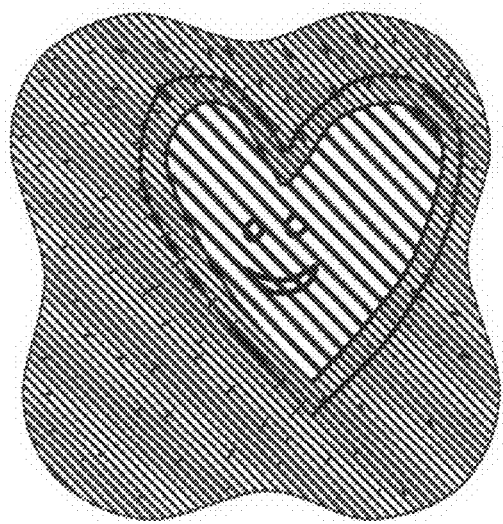
FIGS. 26A-D are diagrams illustrating curve evolution parameter functions on a three dimensional surface and stylized developable surfaces computed from curve loops evolved using the these functions.
Figure 26B:
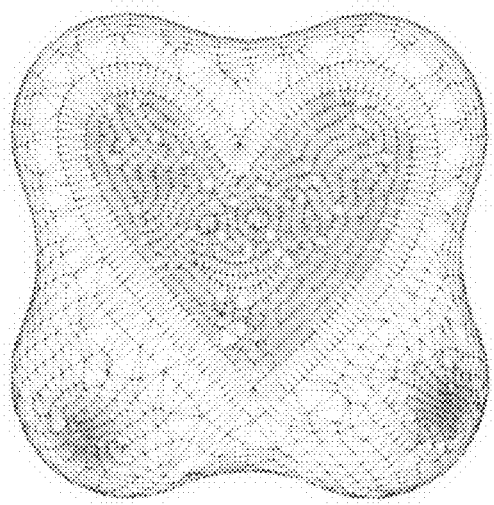
Figure 26C:
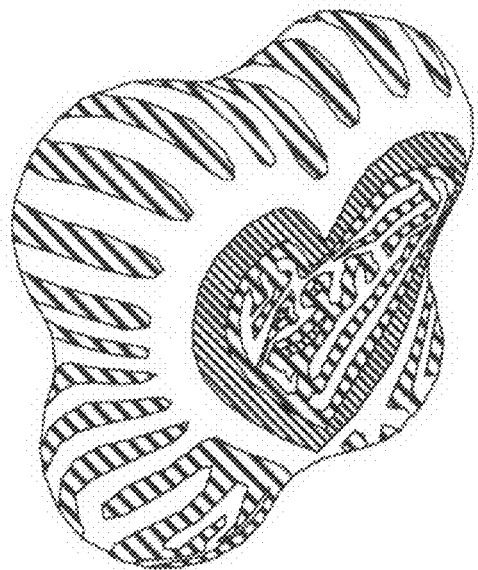
Figure 26D:
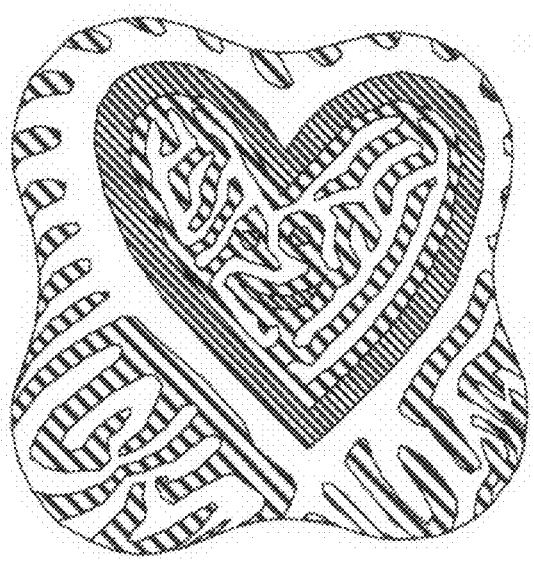
Figure 29A:
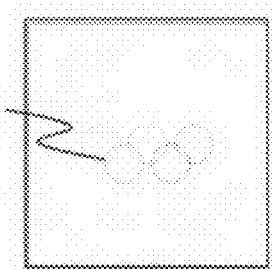
FIGS. 29A-F are diagrams that illustrate an animation where a network of circles evolve into a portrait.
Figure 29B:
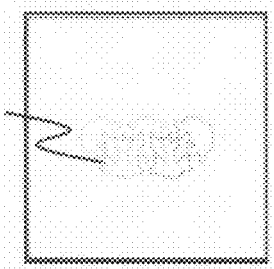
Figure 29C:
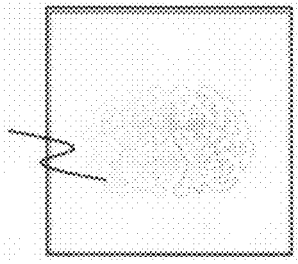
Figure 29D:
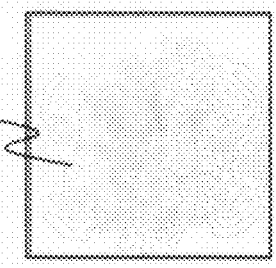
Figure 29E:
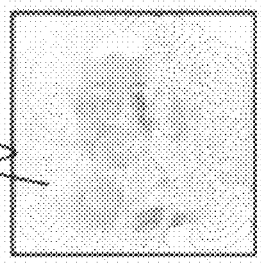
Figure 29F:
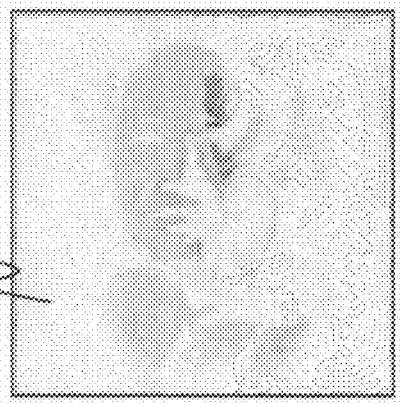

Boundary curves can be used to define regions in two dimensional surfaces. FIG. 26A shows a non-Euclidean surface with boundary curves formed by a hand drawn heart region 2600 containing two eyes and a smiling mouth. These curves divide the surface into a number of closed regions. In a preferred implementation, the regions can be selected by clicking on them. A pattern of evolution parameters can then be assigned to the selected region just like the previously discussed implementation. The selected regions are rendered in a distinct rendering style to make it clear in which region the parameters are being edited. The user can select predefined parameter settings from a predefined library. The parameter values for the selected pattern are then written to the data structure, e.g., either a (u,v) texture map or a function stored with mesh vertices. The gray shading of the surface shown in FIG. 26A represents values of an evolution parameter function (e.g., scaling function) defined on the surface. The concepts of boundary gap curves and blending also generalize directly to surfaces. A gradient vector field defined on the surface (indicated in FIG. 26A by small line segments covering the surface) is also provided as an evolution function. FIG. 26B shows a triangulation computed from loops of labyrinth curves evolved using the boundary curves and parameter functions shown in FIG. 26A. The gradient vector field was used to control the orientation of the strips in the largest region. Further, a scaling function was stored in a texture map. The scaling function was set to decrease the strip width at the two spots marked in white on FIG. 26A as well as in the interior of the heart. FIG. 26C and FIG. 26D shows different views of the final developable strips. Each triangle strip is indicated by a different shade and the boundaries between the strips correspond to the loops formed by the evolved labyrinth curves and the boundary curves shown in FIG. 26A.

Figure 35A:
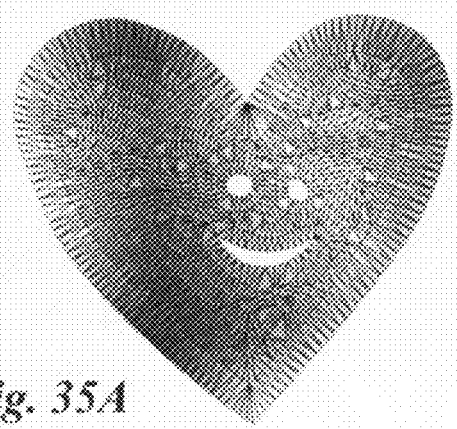
FIGS. 35A-E are diagrams illustrating how an alternative triangle strip can be obtained by triangulating the chordal axis (i.e., the set of curves that connect the mid-points of interior mesh edges) of the triangulation of the original curve loops.
Figure 35B:
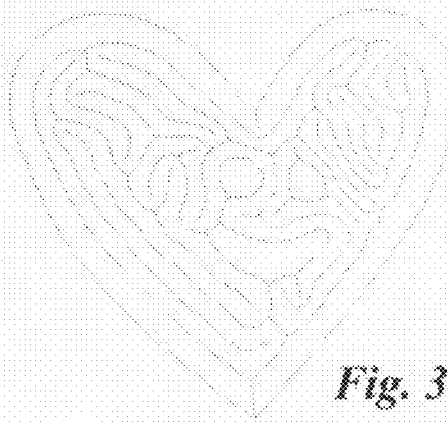
Figure 35C:
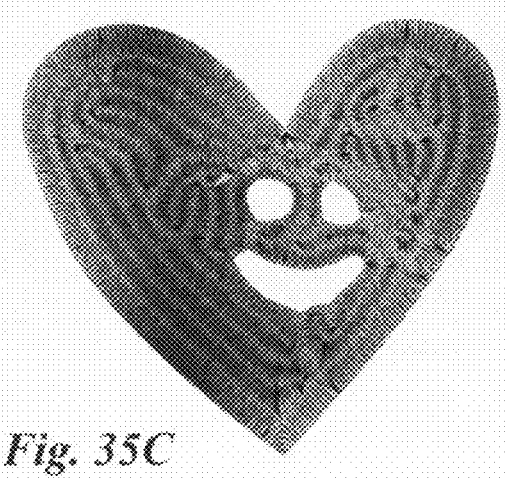
Figure 35D:
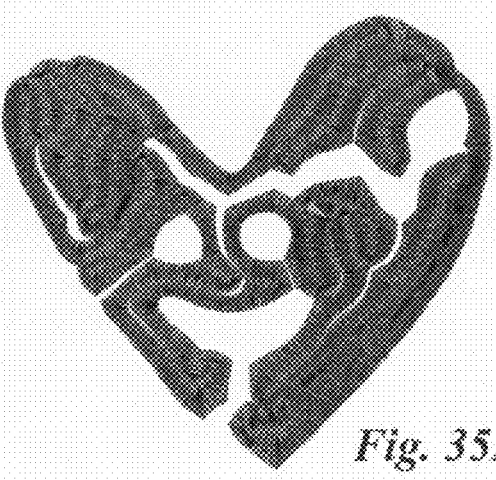
Figure 35E:
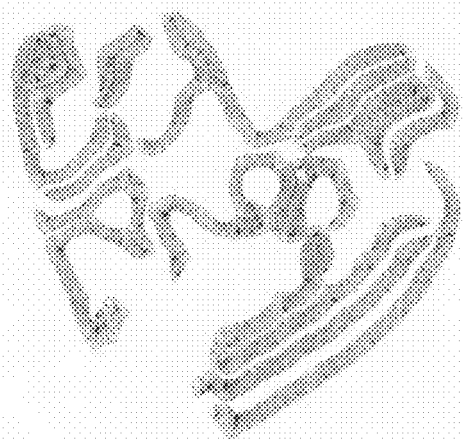

Given the triangulation of the input curve loops, there is a simple technique for creating an alternative triangle strip with a different structure. FIG. 35A shows part of the triangulation of strips from FIG. 26B. FIG. 35B shows the curves obtained by connecting the midpoints of interior edges of the triangle strips of FIG. 35A. These curves form a different set of curve loops that can be triangulated using the previously discussed technique. FIG. 35C shows the resulting triangulation. Note that it forms a single triangle strip with no branches. FIG. 35D shows the triangle strip developed into the plane. FIG. 35E shows how the triangle strip can be cut to remove self-intersections.

Although the method works even if developed triangle strips are self-intersecting, it is desirable to reduce the number of self-intersections to make it easier to join strips into physical artifacts. The lower the number of triangle strips, the easier it is to match up the strips during the assembly. The method allows the user to reduce or eliminate self-intersecting triangle strips by placing the input curves strategically so the evolving curve loops will be confined to semi-developable regions of the surface. FIG. 27 shows two triangle strips created from a single closed labyrinth curve evolved on a sphere. The curve was initially placed at the equator. Note how there are no self-intersections. The two circles 2700 and 2710 shown in FIG. 27 mark two complementary (i.e., matching) triangle strip segments. Together, the two triangle strips cover the sphere.

Figure 34A:
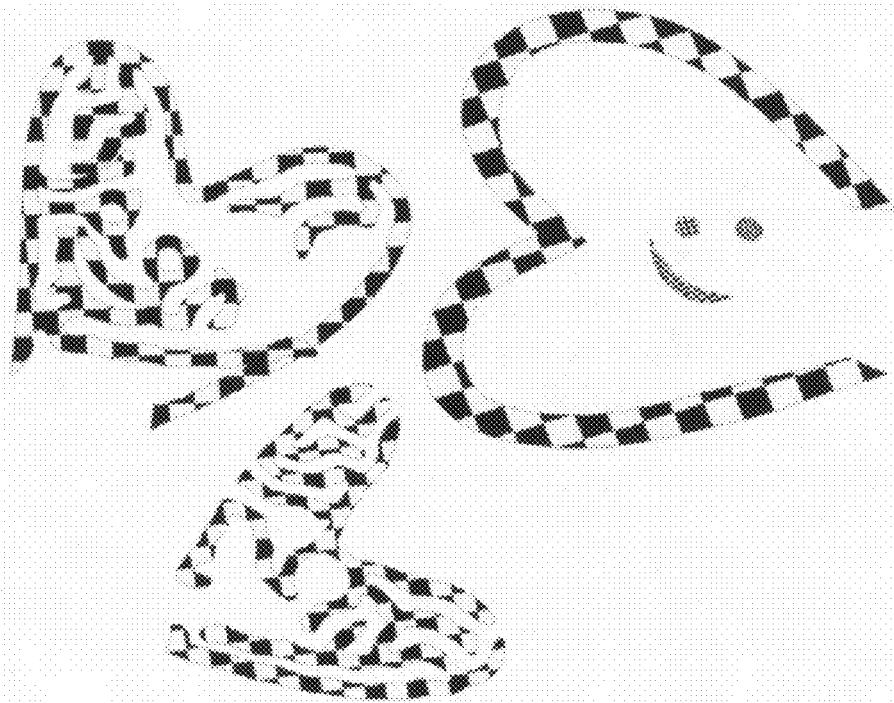
FIGS. 34A-B are diagrams illustrating how developable surfaces can be assigned a (u,v) surface parameterization and how this can be used to map image textures to the developable surface.
Figure 34B:
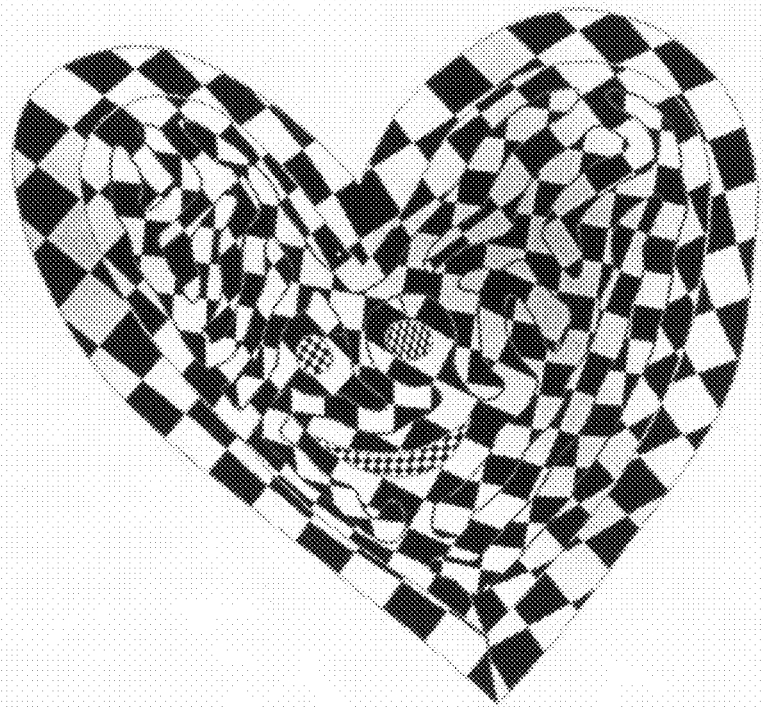

FIGS. 34A-B illustrate how triangle strips developed onto the plane can be assigned a (u,v) parameterization. The (u,v) coordinates are indicated in FIG. 34A by a separate checkerboard pattern for each triangle strip. FIG. 34B shows the same triangle strips with the texture maps mapped to the three dimensional triangulation shown in FIG. 26B. Texture maps can store any image and are widely used in the field of computer graphics to enhance the appearance of three dimensional objects.

To assemble physical articles from paper, developed triangle strips with texture maps are preferably printed on a laser printer or other color printer. Preferably, the triangle strips are scaled so that their width is at least 5 mm when printed on paper. Textures are printed on both sides of the paper with the exterior side showing a decorative pattern and the interior side a technical drawing. FIG. 28A shows the exterior side of a triangle strip with a checkerboard texture. Small tabs 2800 have been added automatically along the boundary of the strip at regular intervals. During the assembly, an adhesive may be used to attach the exterior side of each tab to the interior side of another triangle strip. On the exterior side, each tab has a printed code that identifies the triangle strip (in this case "A") and the number of the tab along that strip. Preferably, the strip would be identified by a color. The interior side of each strip has a texture map with markings indicating how the strips should be lined up during assembly. FIG. 28B-C shows examples of such markings. FIG. 28C shows a close-up of markings 2810 indicating where tabs belonging to adjacent triangle strips should be attached. In addition, the interior side clearly identifies the strips (in this case with the letter "A" although preferably a color would be used). Finally, the interior texture map shows a set of triangles to help line up the strips accurately.

For materials that other than paper, or for paper that is not compatible with printers, only the technical drawing on the interior side of the texture is printed. The material is then preferably attached to the paper with an adhesive (such as acid free paper cement) such that the printed side is visible. The strips are then cut, either by hand or with a laser cutter.

The methods described above may be implemented using commercially available hardware and software components conventionally used for computer graphics applications. For example, when implemented in OpenGL using a 2.3 GHz Pentium IV processor, the curves evolve in real time at interactive rates. Due to repeated subdivision of the curves, it may be important to defragment the sample point vector to ensure memory locality. Performance is also impacted by the use of multiple spatial modulation parameters. Consequently, it may be desirable in some implementations to provide a library of predefined high-performance parameter families for users to select from. For example, the inventors have found empirically that the following parameter ranges are stable and tend to produce interesting results:

Range $\{f_S\}=[0.005, 0.3]$

Range $\{f_R\}=[0, 0.2]$

Range $\{f_A\}=[0, 10]$ $k_0 \in [0.1, 0.3]$ $k_1 \in [1.5 k_0, 2.5 k_0]$ $k_{min} \approx 0.2$ $k_{max} \approx 1.2$ δ start at 1, then decrease gradually as desired.

In another application of the method, curves are evolved on a non-Euclidean surface geometry, as shown in FIGS. 36A-B. The resulting curves in three dimensional space can then be used as a model to create stylized sculptures of three dimensional objects, either manually or using automated carving or etching systems.

The invention claimed is:

1. A computer-implemented method for generating curves resembling labyrinths and maze-like patterns, the method comprising:
   a) initializing by a computer curve evolution parameters and a curve network, wherein the curve network comprises a curve embedded in an evolution space, wherein the evolution space has an evolution space dimension of at least two, wherein the curve comprises a linearly ordered set of sample points in the evolution space, and wherein the curve evolution parameters comprise real-valued functions defined on the evolution space;
   b) evolving by the computer the curve using an iterative process, wherein the curve evolves in accordance with the curve evolution parameters and user input during the iterative process to produce an evolved curve having an increased geometric complexity; and
   c) rendering by the computer the evolved curve and displaying on a display the evolved curve;
   wherein each iteration of the iterative process comprises:
   i) displaying the curve on a display and providing a graphical user interface allowing the curve network and the curve evolution parameters to be modified by a user;
   ii) resampling the curve to increase the uniformity of spacing between adjacent point samples of the curve; and
   iii) spatially modulating the sample points of the curve by the curve evolution parameters, wherein the spatial modulation comprises computing, for each of the sample points, a displacement calculated in part by evaluating at each of the sample points a function defined on the evolution space.

2. The method of claim 1 wherein the evolution space is a two-dimensional Euclidean space.

3. The method of claim 1 wherein the evolution space is a two-dimensional non-Euclidean space embedded in a three-dimensional Euclidean space.

4. The method of claim 1 wherein the evolution space is a three-dimensional Euclidean space.

5. The method of claim 1 wherein the curve network comprises a point evolution rate associated with a selected sample point of the curve, and wherein evolving the curve using the iterative process comprises inhibiting displacement of the selected sample point for a proportion of iterations dependent upon the point evolution rate.

6. The method of claim 1 wherein the curve network comprises a second curve embedded in the evolution space, and wherein the method further comprises evolving the second curve and rendering the evolved second curve.

7. The method of claim 1 wherein the curve network comprises a boundary embedded in the evolution space, and wherein the boundary has a boundary dimension equal to one less than the evolution space dimension.

8. The method of claim 7 wherein computing the displacement comprises computing a displacement due to attraction-repulsion between a sample point of the curve and a sample point of the boundary in a neighborhood of the sample point of the curve.

9. The method of claim 7 wherein the curve network comprises a boundary gap corresponding to a subset of the boundary, wherein computing the displacement comprises computing a weakened attraction-repulsion between the sample point of the curve and the sample point of the boundary if the sample point of the boundary is in the boundary gap.

10. The method of claim 1 wherein evolving the curve using the iterative process increases a length of the curve and a number of inflection points of the curve.

11. The method of claim 1 wherein the curve evolution parameters comprise a positive real-valued function defined on the evolution space, whose values at points in the evolution space are derived from pixel intensity values of a surface texture map.

12. The method of claim 1 wherein computing the displacement comprises computing a combination of a random displacement, a smoothing displacement, and an attraction-repulsion displacement.

13. The method of claim 1 wherein the curve evolution parameters comprise a positive real-valued scaling function δ defined on the evolution space.

14. The method of claim 1 wherein the curve evolution parameters comprise a gradient field $\nabla f_G$ defined on the evolution space.

15. The method of claim 1 wherein the curve evolution parameters comprise a gradient field $\nabla f_G$ computed from the closest distance function from any point in the evolution point to the boundary curves.

16. The method of claim 1 wherein computing the displacement comprises evaluating a scaling function δ at a point in the evolution space.

17. The method of claim 1 wherein the curve evolution parameters comprise a positive real-valued randomness strength function $\theta_R$ defined on the evolution space.

18. The method of claim 1 wherein computing the displacement comprises stochastically selecting a random offset vector.

19. The method of claim 1 wherein computing the displacement comprises evaluating a randomness strength function $f_R$ at a point in the evolution space.

20. The method of claim 1 wherein the curve evolution parameters comprise a positive real-valued smoothness strength function $\theta_S$ defined on the evolution space.

21. The method of claim 1 wherein computing the displacement comprises evaluating a smoothness strength function $f_S$ at a point in the evolution space.

22. The method of claim 1 wherein computing the displacement comprises computing a weighted average of adjacent points.

23. The method of claim 1 wherein computing the displacement comprises computing a displacement due to attraction-repulsion between a first sample point of the curve and a second sample point of the curve in a neighborhood of the first sample point.

24. The method of claim 23 wherein the computed displacement between the first sample point and the second sample point is an attraction if the first and second points are separated by a distance greater than a predetermined distance $R_0$ and a repulsion if the first and second points are separated by a distance less than the predetermined distance $R_0$.

25. The method of claim 1 wherein the curve evolution parameters comprise a positive real-valued attraction-repulsion strength function $f_A$ defined on the evolution space.

26. The method of claim 1 wherein computing the displacement comprises evaluating an attraction-repulsion strength function $f_A$ at a point in the evolution space.

27. The method of claim 1 wherein allowing the curve network and the curve evolution parameters to be modified by a user comprises allowing boundary sample points to be edited by the user.

28. The method of claim 1 wherein allowing the curve network and the curve evolution parameters to be modified by a user comprises allowing a boundary gap to be edited by the user.

29. The method of claim 1 wherein allowing the curve network and the curve evolution parameters to be modified by a user comprises allowing the curve sample points to be edited by the user.

30. The method of claim 1 wherein allowing the curve network and the curve evolution parameters to be modified by a user comprises allowing point evolution rates associated with sample points of the curve to be edited by the user.

31. The method of claim 1 wherein evolving the curve comprises rendering and displaying the curve during the evolution of the curve.

32. The method of claim 1 wherein the curve evolution parameters are selected from a set of predefined curve evolution parameters.

33. The method of claim 1 wherein computing the displacement comprises calculating all curve points within a specified distance of a given sample point.

34. The method of claim 1 wherein resampling the curve comprises adding sample points to subdivide curve segments whose length is greater than a maximum threshold distance and removing sample points to delete curve segments whose length is less than a minimum threshold distance, wherein the maximum threshold distance and the minimum threshold distance are computed from a spatially-dependent real-valued scaling function defined on the evolution space.

35. The method of claim 1 further comprising linearly mapping distances along the length of the evolved curve to linearly ordered data and providing a user interface allowing the linearly ordered data to be navigated using the rendering of the evolved curve.

36. The method of claim 1 wherein rendering the evolved curve comprises linearly mapping a string of text to the evolved curve such that the string of text is aligned with the evolved curve.

37. The method of claim 1 wherein rendering the evolved curve comprises selecting intensity values for a rendered point of the evolved curve from a corresponding point of an image projected onto the evolution space.

38. The method of claim 1 further comprising rendering the evolved curve at different time intervals to produce an animation.

39. The method of claim 1 wherein the evolved curve comprises a vector art embroidery design for use with a computerized sewing machine.

40. The method of claim 1 wherein the evolved curve represents a model for the construction of a stylized three dimensional sculpture.

41. The method of claim 1 wherein the evolution space is a surface, wherein the evolved curve and the boundary and boundary gap curves form loops separating regions of the evolution space, and wherein the method further comprises triangulating the regions to generate triangulated strips, developing the triangulated strips onto the plane, and cutting the projected strips to avoid loops and self-intersections.

42. The method of claim 41 further comprising printing text and symbols on the interior side of the developed triangle strips to indicate where triangle strip boundaries should line up during assembly of physical articles.

43. The method of claim 41 further comprising adding tabs to the developed triangle strips so the tabs can be attached to adjacent strips with an adhesive during assembly of physical articles.

44. The method of claim 41 further comprising cutting a material using the projected strips as a pattern to produce a cut material.

45. The method of claim 44 further comprising joining edges of the cut material to form a physical article resembling the evolution space.

* * * * *